US008708826B2

(12) United States Patent
Robb et al.

(10) Patent No.: US 8,708,826 B2
(45) Date of Patent: Apr. 29, 2014

(54) CONTROLLED ACCESS SWITCH

(75) Inventors: Harold K. Robb, Reno, NV (US); Steven R. Oaks, Reno, NV (US)

(73) Assignee: Bally Gaming, Inc., Las Vegas, NV (US)

(*) Notice: Subject to any disclaimer, the term of this patent is extended or adjusted under 35 U.S.C. 154(b) by 1134 days.

(21) Appl. No.: 11/550,781

(22) Filed: Oct. 18, 2006

(65) Prior Publication Data

US 2007/0111798 A1 May 17, 2007

Related U.S. Application Data

(63) Continuation-in-part of application No. 11/329,715, filed on Jan. 10, 2006, now abandoned, and a continuation-in-part of application No. 10/943,771, filed on Sep. 16, 2004, now Pat. No. 7,950,999, and a continuation-in-part of application No. 11/065,757, filed on Feb. 24, 2005, now Pat. No. 7,749,076, and a continuation-in-part of application No. 11/092,179, filed on Mar. 28, 2005, and a continuation-in-part of application No. 09/967,283, filed on Sep. 28, 2001, now Pat. No. 7,338,372.

(51) Int. Cl.
*A63F 13/12* (2006.01)

(52) U.S. Cl.
USPC .................................... 463/42; 463/29; 726/4

(58) Field of Classification Search
USPC .......................................... 463/42, 29; 726/4
See application file for complete search history.

(56) References Cited

U.S. PATENT DOCUMENTS

| | | | |
|---|---|---|---|
| 3,662,105 | A | 5/1972 | Hurst et al. |
| 4,448,419 | A | 5/1984 | Telnaes |
| 4,676,506 | A | 6/1987 | Crouch |
| 4,718,672 | A | 1/1988 | Okada |
| 4,837,728 | A | 6/1989 | Barrie et al. |
| 5,429,361 | A | 7/1995 | Raven et al. |
| 5,599,231 | A | 2/1997 | Hibino et al. |
| 5,655,961 | A | 8/1997 | Acres et al. |
| 5,702,304 | A | 12/1997 | Acres et al. |
| 5,741,183 | A | 4/1998 | Acres et al. |
| 5,752,882 | A | 5/1998 | Acres et al. |
| 5,759,102 | A | 6/1998 | Pease et al. |

(Continued)

FOREIGN PATENT DOCUMENTS

| | | |
|---|---|---|
| AU | 704691 | 4/1997 |
| EP | 0769769 A1 | 4/1997 |

(Continued)

OTHER PUBLICATIONS

Supplementary European Search Report for EP02 77 8385.1-2218 PCT/US0230820, dated Sep. 26, 2006, Applicant Bally Gaming Inc.

*Primary Examiner* — Arthur O Hall
*Assistant Examiner* — Allen Chan
(74) *Attorney, Agent, or Firm* — Marvin Hein

(57) ABSTRACT

A Controlled Access Switch (CAS) that can act as an 802.1x supplicant. The system implements server based software that uses SNMP and a database to insure that only secured non-802.1x capable devices are allowed access. The CAS allows an organization to use the CAS as a front end to non-802.1x capable devices such as printers and faxes and become the Supplicant in the 802.1x system. It then secures its ingress ports in coordination with the CAS Control Program running on a central site server.

4 Claims, 9 Drawing Sheets

(56) References Cited

U.S. PATENT DOCUMENTS

| | | | | |
|---|---|---|---|---|
| 5,769,716 | A | 6/1998 | Saffari et al. | |
| 5,770,533 | A | 6/1998 | Franchi | |
| 5,779,545 | A | 7/1998 | Berg et al. | |
| 5,796,389 | A | 8/1998 | Bertram et al. | |
| 5,809,482 | A | 9/1998 | Strisower | |
| 5,816,918 | A | 10/1998 | Kelly et al. | |
| 5,820,459 | A | 10/1998 | Acres et al. | |
| 5,833,536 | A | 11/1998 | Davids et al. | |
| 5,833,540 | A | 11/1998 | Miodunski et al. | |
| 5,836,817 | A | 11/1998 | Acres et al. | |
| 5,851,148 | A | 12/1998 | Brune et al. | |
| 5,876,284 | A | 3/1999 | Acres et al. | |
| 5,885,158 | A | 3/1999 | Torango et al. | |
| 5,919,091 | A | 7/1999 | Bell et al. | |
| 5,967,896 | A | 10/1999 | Jorasch et al. | |
| 5,984,779 | A | 11/1999 | Bridgeman et al. | |
| 6,008,784 | A | 12/1999 | Acres et al. | |
| 6,010,404 | A | 1/2000 | Walker et al. | |
| 6,068,552 | A | 5/2000 | Walker et al. | |
| 6,077,163 | A | 6/2000 | Walker et al. | |
| 6,110,041 | A | 8/2000 | Walker et al. | |
| 6,113,495 | A | 9/2000 | Walker et al. | |
| 6,162,122 | A | 12/2000 | Acres et al. | |
| 6,203,433 | B1 * | 3/2001 | Kume | 463/42 |
| 6,244,958 | B1 | 6/2001 | Acres | |
| 6,254,483 | B1 | 7/2001 | Acres | |
| 6,257,981 | B1 | 7/2001 | Acres et al. | |
| 6,280,328 | B1 | 8/2001 | Holch et al. | |
| 6,293,866 | B1 | 9/2001 | Walker et al. | |
| 6,302,790 | B1 | 10/2001 | Brossard | |
| 6,312,333 | B1 | 11/2001 | Acres | |
| 6,319,125 | B1 | 11/2001 | Acres | |
| 6,364,768 | B1 | 4/2002 | Acres et al. | |
| 6,371,852 | B1 | 4/2002 | Acres | |
| 6,375,567 | B1 | 4/2002 | Acres | |
| 6,375,569 | B1 | 4/2002 | Acres | |
| 6,393,484 | B1 * | 5/2002 | Massarani | 709/227 |
| 6,431,983 | B2 | 8/2002 | Acres | |
| RE37,885 | E | 10/2002 | Acres | |
| 6,565,434 | B1 | 5/2003 | Acres | |
| 6,607,441 | B1 | 8/2003 | Acres | |
| 6,652,378 | B2 | 11/2003 | Cannon et al. | |
| 6,712,697 | B2 | 3/2004 | Acres | |
| 6,712,698 | B2 | 3/2004 | Paulsen et al. | |
| 6,722,985 | B2 | 4/2004 | Criss-Puszkiewicz | |
| 6,722,986 | B1 | 4/2004 | Lyons et al. | |
| 6,800,030 | B2 | 10/2004 | Acres | |
| 6,832,958 | B2 | 12/2004 | Acres et al. | |
| 6,910,964 | B2 | 6/2005 | Acres | |
| RE38,812 | E | 10/2005 | Acres et al. | |
| D531,333 | S | 10/2006 | Acres et al. | |
| 2002/0107857 | A1 * | 8/2002 | Teraslinna | 707/100 |
| 2002/0154332 | A1 * | 10/2002 | Inai et al. | 358/1.15 |
| 2003/0060247 | A1 | 3/2003 | Goldberg et al. | |
| 2004/0002383 | A1 | 1/2004 | Lundy et al. | |
| 2004/0100490 | A1 | 5/2004 | Boston et al. | |
| 2004/0142750 | A1 | 7/2004 | Glisson et al. | |
| 2004/0158735 | A1 * | 8/2004 | Roese | 713/200 |
| 2005/0063400 | A1 * | 3/2005 | Lum | 370/401 |
| 2005/0091388 | A1 * | 4/2005 | Kamboh et al. | 709/228 |
| 2005/0125692 | A1 * | 6/2005 | Cox et al. | 713/201 |
| 2006/0259768 | A1 * | 11/2006 | Chow | 713/168 |

FOREIGN PATENT DOCUMENTS

| | | | |
|---|---|---|---|
| EP | 1004970 | A | 5/2000 |
| EP | 1074955 | A | 2/2001 |
| GB | 2042234 | A | 9/1980 |
| GB | 2092796 | A | 7/2001 |
| WO | WO9623288 | A | 8/1996 |
| WO | 2004/024260 | | 3/2004 |

* cited by examiner

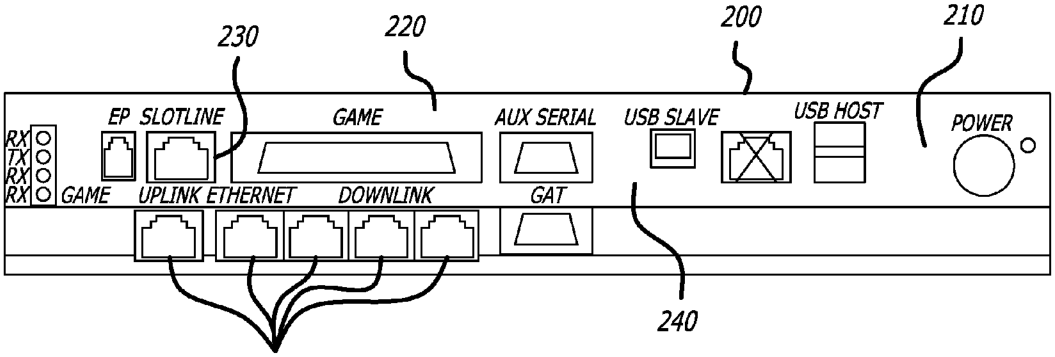
FIG. 5
FIG. 6
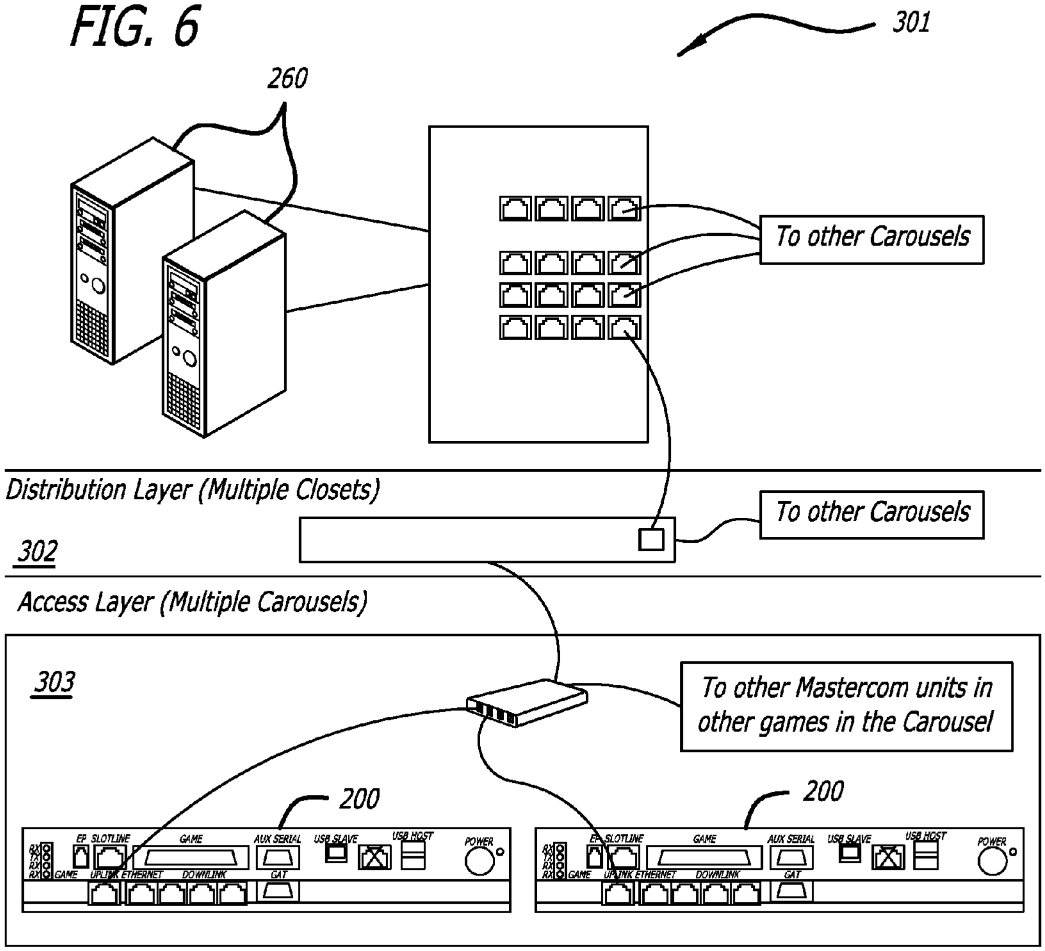

CONTROLLED ACCESS SWITCH

CROSS-REFERENCE TO RELATED APPLICATIONS

This application is a continuation-in-part of U.S. patent application Ser. No. 11/329,715 filed Jan. 10, 2006, entitled CONTROLLED ACCESS LAYER SYSTEM AND METHOD, now abandoned which is hereby incorporated herein by reference. This application is a continuation-in-part of U.S. patent application Ser. No. 10/943,771 filed Sep. 16, 2004, entitled USER INTERFACE SYSTEM AND METHOD FOR A GAMING MACHINE, now U.S. Pat. No. 7,950,999, issued May 31, 2011, which is hereby incorporated herein by reference. This application is also a continuation-in-part of U.S. patent application Ser. No. 11/065,757 filed Feb. 24, 2005, entitled SYSTEM AND METHOD FOR AN ALTERABLE STORAGE MEDIA IN A GAMING MACHINE, now U.S. Pat. No. 7,749,076, issued Jul. 6, 2010, which is hereby incorporated herein by reference; this application is also a continuation-in-part of U.S. patent application Ser. No. 11/092,179 filed Mar. 28, 2005, entitled GAMING DEVICE NETWORK MANAGING SYSTEM AND METHOD; and this application is also a continuation-in-part of U.S. patent application Ser. No. 09/967,283 filed Sep. 28, 2001, entitled RECONFIGURABLE GAMING MACHINE, now U.S. Pat. No. 7,338,372, issued Mar. 4, 2008, which is hereby incorporated herein by reference.

CROSS-REFERENCE TO RELATED APPLICATION

This application is related to co-pending U.S. CIP patent application Ser. No. 11/550,782 filed Oct. 18, 2006.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD

This system relates generally to a system and method for utilizing a controlled access device to produce a controlled access layer in a packet switching environment, and more particularly, to a system and method for utilizing a controlled access device that encodes specific types of data for high priority packet delivery in a controlled access layer of a packet switching environment and may be used to permit access to a network for an extended range of devices.

BACKGROUND

Today's slot machines have parameters programmed into their code such as theme, percentage, denomination, lines bet, minimum bet, maximum bet, game run time, and the like. Changing any of these parameters requires new game code, regulatory approval for the code changes, physical movement of machines weighing hundreds of pounds and regulatory approval for the move and oversight.

Past methods of changing games on the floor have been manual in nature. As stated above, games and their associated gaming parameters are typically programmed into EPROMs (Erasable Programmable Read-Only Memory) contained within the gaming machines. Accordingly, the changing of games (or modifying gaming parameters) requires the EPROMs to be changed. Such a procedure involves physically opening the gaming machines, erasing and reprogramming the code (EPROM), and re-sealing the EPROM if required by the regulatory jurisdiction. This also requires the entire game to be 're-optioned' which is a long, error-prone manual process.

Furthermore, gaming machines have operated for the most part as stand-alone devices, at least with respect to non-progressive gaming. In this regard, while there may have existed some limited forms of communication or networking, fully-networked data and communication systems have not been traditionally implemented. One reason for this lack of fully-networked infrastructure is the difficulty in upgrading system infrastructure, due to the constant utilization of a gaming system, 24 hours a day, 7 days a week, 365 days a year. For this reason and others, gaming machines have typically been utilized as separate machines, which are swapped out or upgraded, but which generally operate autonomously. It would be desirable for gaming machines instead, to be utilized as components of a larger interactive and symphonious organizational arrangement. However, many obstacles have made such an arrangement difficult and unwieldy to visualize, let alone implement.

However, the lack of such a system deprives casino owners of both apparent and actual control over their gaming floors. Further, casino patrons are limited in the variety and selection of both games, and the gaming parameters within such games, that are available to them. These limitations are commonly due to the particularized nature and general lack of customization typically associated with individual gaming machines. In this regard, casino owners have become aware that by adding additional features to gaming machines, they may be able to maintain a player's attention to the gaming machines for longer periods of time. This, in turn, leads to the player wagering at the gaming machine for longer periods of time, thereby increasing casino profits.

One technique that has been employed to maintain a player's attention at the gaming machine has been to provide players with access to gambling-related information. Moreover, it would be desirable to provide the player with interactive access to the above information. This type of interactivity would allow players significantly more flexibility to make use of the above-described information. The gambling-related information could also be utilized by the player in a much more efficient manner. In this regard, greater levels of flexibility and access are likely to make a player remain and gamble at the gaming machine for significantly longer periods of time. Unfortunately, the system components that are currently utilized for displaying and accessing this type of information, such as external keypads and display modules, are extremely limited in the functionality and capabilities that they provide, thus limiting the success of their ability to maintain a player's attention.

As technology advances in the casino gaming environments, the network architecture is moving towards high-speed Ethernet networks (or other standard broadband protocol) that replace the previous serial networks and proprietary data acquisition systems. Often, the network architecture in these Ethernet gaming networks has a very controlled access layer environment. In this regard, sometimes the network architecture utilizes a layered network topology.

The first or top layer is typically referred to as the core layer, which is the backbone of the system. In this layer there are usually very robust and high-speed switches in a data center environment. These switches can process packets very rapidly. Preferably, only decisions relating to packet destination and packet transmission are made in the core layer.

The next layer, which connects to the core layer, is typically referred to as the distribution layer. The primary job of the distribution layer is aggregation and routing. Often this layer raises the network frames at OSI (Open System Interconnect) layer 2 to routable packets at OSI layer 3.

The base layer is typically referred to as the access layer. The access layer is the starting point for most traffic on the network. The access or workgroup layer connects users and devices. Important functions of the access layer include shared bandwidth, switched bandwidth, MAC-layer (Media Access Control layer) filtering, and micro segmentation. A MAC address refers to a hardware address that uniquely identifies a node of a network. The access layer is designed to pass traffic to the network for valid network users and to filter traffic that is passed along through the network. Typically, the access layer is the point at which end users are connected to the network. Additionally, the access layer provides the means to connect to the devices located in the distribution layer, as well as providing connections to both local and remote devices. Security and policy decisions are also made at the access layer since the access layer is the entry point to the network.

The prior data acquisition systems have typically been based on a proprietary network that utilized a serial protocol standard. While the data rates of such prior systems were relatively slow ((7.2 kbs) in comparison to even the slowest Ethernet speeds (10 Mbs)), these prior networks were single-use networks with the sole purpose of communicating the SDS (Slot Data Systems) information (or other similar game accounting information) to and from the floor.

An Ethernet network, having significantly more bandwidth, would typically be utilized as a shared network where the SDS (or other similar game accounting protocol) is only an application that runs on the network along with other applications and servers. Instead of controlling a proprietary network, a prior casino network might even be integrated into an existing casino Ethernet network.

Typically, the prior serial networks did not support many new technologies such as iView devices (i.e., player tracking user interface devices), System Gaming, and game downloads. Additional technologies are also likely to follow once more bandwidth is made available. With these new technologies, many of which are bandwidth-intensive, there is a growing need to ensure that SDS data (or other similar game accounting data) maintains precedence and consistently arrives at the SDS server without loosing data.

One relevant LAN (local-area network) technology is known as Quality of Service (QoS). This technology allows the network to place certain packets at a higher priority than other packets to ensure timely delivery. Normally, networks are "best effort" delivery. QoS adds in the ability to prioritize certain packets for a better and more controlled delivery. Typically, QoS is used is to ensure timely delivery of data in applications such as a Voice over IP network (VoIP). Instead of the "first-in-first-out," best effort delivery of many shared networks, QoS ensures timely delivery of data with virtually no packet loss. Similarly, in the casino environment, game accounting data also requires that data packets are delivered in a timely fashion with no packet loss.

Referring again to VoIP, since VoIP data (and now streaming video, video conferencing, and the like) is very sensitive to network delay, under QoS the VoIP packets are given a priority that places the VoIP packets into a high priority queue. The high priority queue is serviced until empty while other less sensitive data waits in another lower priority queue or queues. Since technologies like VoIP are industry standards, most switches recognize them and supply a QoS designation to ensure that VoIP packets take precedence in any communication stream.

Referring again to an access layer of a layered network, it is beneficial to make policy decisions at the access layer because this is usually the "ingress level." The ingress level is the point in the system where packets enter the network. Accordingly, this is a timely point at which to examine the packets and make policy decisions based on the packet information.

Typically, there are two ways to prioritize data packets using QoS. Using one technique, a QoS aware access switch uses the port location on the switch to indicate in which port the high priority is located. However, in this scenario, there is nothing to stop personnel from either accidentally or intentionally moving the plug to a different port location, thus giving whatever is plugged into the high priority port the highest priority, and giving the intended high priority data the lower priority. This could possibly lead to packet loss of the intended high priority data.

Another technique to supply the QoS information uses a non-controlled device but encodes the QoS code into the IP packets of the intended high priority data. This technique provides the right encoding, but is required to be performed in a Controlled Access environment. The problem with using a non-controlled device stems from the potential for a third party to program their game (or other device) to download packets with a high priority QoS code, thus making this game compete for bandwidth with the intended high priority data. Even if the access switch has the capabilities to filter and change the QoS information, this functionality is typically related to the port location, and thus, involves the same problems noted above. While some high-end switches offer a QoS filter for MAC addresses (the internal address of the Ethernet port), this type of filtering presents significant problems and is difficult to administer.

Accordingly, there exists a continuing need for a system or method for non-industry standard IP communication to be labeled for high quality delivery. The preferred embodiments of the system and method described herein clearly address these and other needs.

SUMMARY

Briefly, and in general terms, the system resolves the above and other problems by providing a configuration and management system for monitoring and controlling one or more gaming devices in a gaming system on at least one gaming floor. The system includes: one or more gaming devices in a gaming system; a processing and control system; and a server-side, graphical user interface including an interactive map of the gaming floor. Preferably, the one or more gaming devices in the gaming system, as well as the processing and control system, are interconnected via a network. The processing and control system acquires gaming performance data from the gaming devices in the gaming system. The server-side, graphical user interface includes an interactive map of the gaming floor. Additionally, the graphical user interface enables monitoring of the gaming performance data from the gaming devices in the gaming system. Further, the graphical user interface enables configuration of multiple gaming platform capabilities, multiple game titles, and multiple gaming parameters for each gaming devices on the gaming floor. Preferably, the graphical user interface is interconnected to the processing and control system.

In another preferred embodiment, the network is a packet-based communication network. In one such embodiment, the packet-based communication network comprises an IP-based message set that utilizes an interface layer between command-driven devices and logical communication channels. Continuing, in such an embodiment, the packet-based communication network implements the BOB (best of breed) protocol, SuperSAS protocol, or other similar packet-based protocol (e.g., G2S (Gaming 2 System)).

In another aspect of a preferred embodiment, the gaming devices include, by way of example only, and not by way of limitation: electronic gaming machines; embedded components, including game monitoring units, and player tracking user interfaces; gaming-related signage; and kiosks. Preferably, the gaming systems that are controllable by the configuration and management system include casino venues, class II venues, and lottery venues. In one aspect of a preferred embodiment, the gaming performance data includes, by way of example only, and not by way of limitation: coin-in activity, coin-out activity, meters, accounting information, security information, and player rating information. In still another aspect of a preferred embodiment, the gaming platform capabilities include platform-specific control over functions including, by way of example only, and not by way of limitation: volume settings, speed of play, hopper limits, log access, platform-specific reports, and asset information, including software and hardware bills of material. Preferably, the gaming platforms include, by way of example only, and not by way of limitation: Alpha, S6000, and Game Maker 2.

In another aspect of the system, a controlled access switch is provided to act as an interface between devices and the controlled access layer. The switch executes functionality so that devices that might not otherwise be capable of participating in a desired security protocol can be permitted entry into a network using the desired security protocol.

Other features and advantages of the system will become apparent from the following detailed description when taken in conjunction with the accompanying drawings, which illustrate by way of example, the features of the system.

BRIEF DESCRIPTION OF THE DRAWINGS

FIG. 5 illustrates a front view of an IP gaming hub, constructed in accordance with the system; and FIG. 6 illustrates a system diagram of IP gaming hubs in an access layer connecting to a Distribution Layer and a Core Layer.

DETAILED DESCRIPTION OF THE PREFERRED EMBODIMENTS

Briefly stated, a preferred embodiment of the gaming-content configuration and management system is directed towards configuring and managing a scalable number of gaming devices using a centrally-connected user interface. The system configures and manages components that are multi-platform, multi-theme, multi-percentage, and multi-denomination. These gaming devices include, by way of example only, and not by way of limitation, electronic gaming machines (EGMs); embedded components, such as GMUs (Game Monitoring Units); and/or player tracking user interfaces (referred to sometimes herein as iView devices or Alpha devices). Such gaming devices further include any uniquely identifiable entity on the gaming floor, including by way of example only, and not by way of limitation, gaming-related signage and kiosks.

Figure 1:
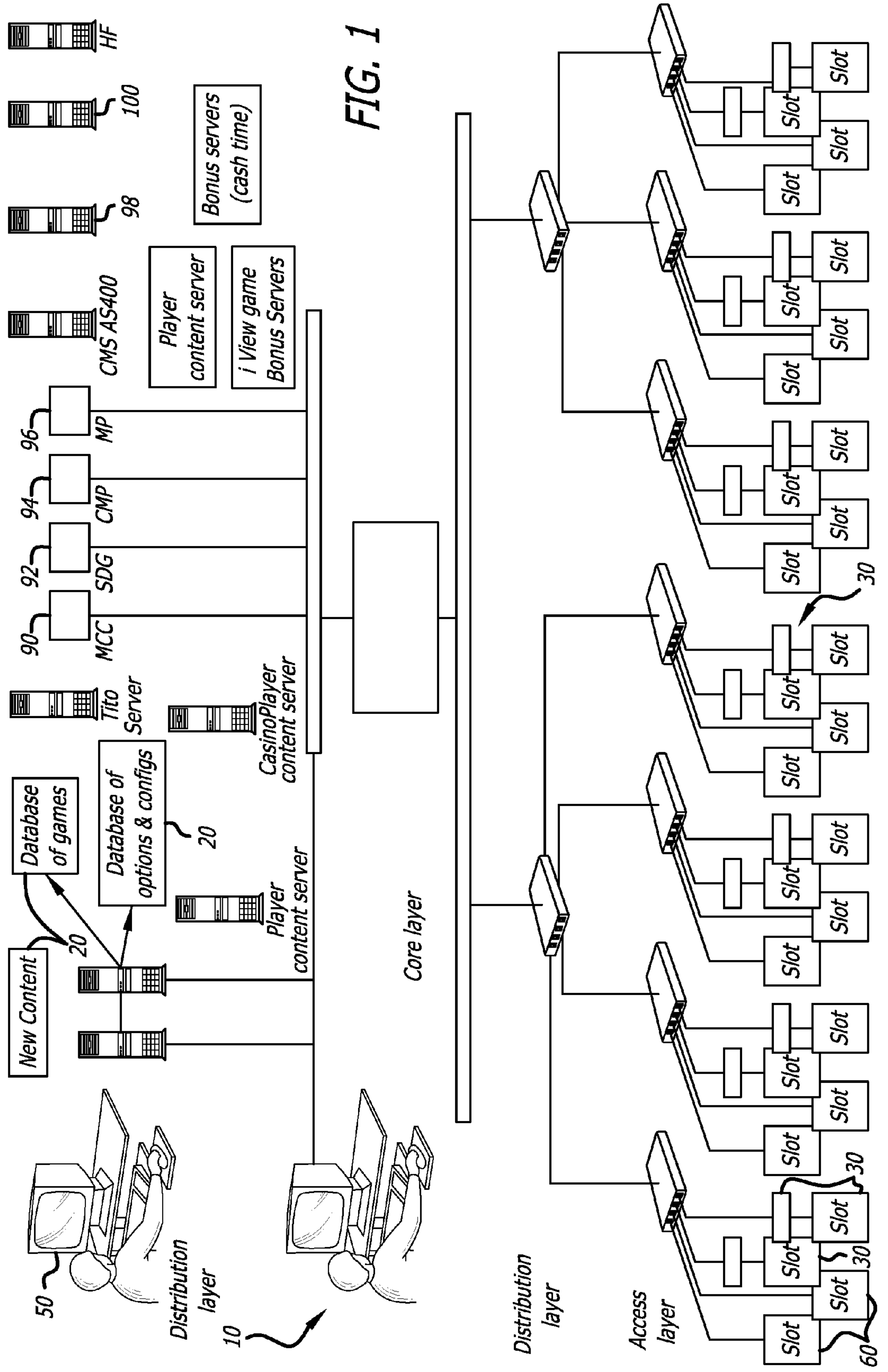
FIG. 1 illustrates a relational diagram of a gaming-content configuration and management system for controlling and managing a gaming system that includes gaming devices on a casino floor connected through networking equipment to multiple tiers of servers on the casino backend, wherein the operators manage the gaming floor from a computer via a graphical user interface.
Figure 2:
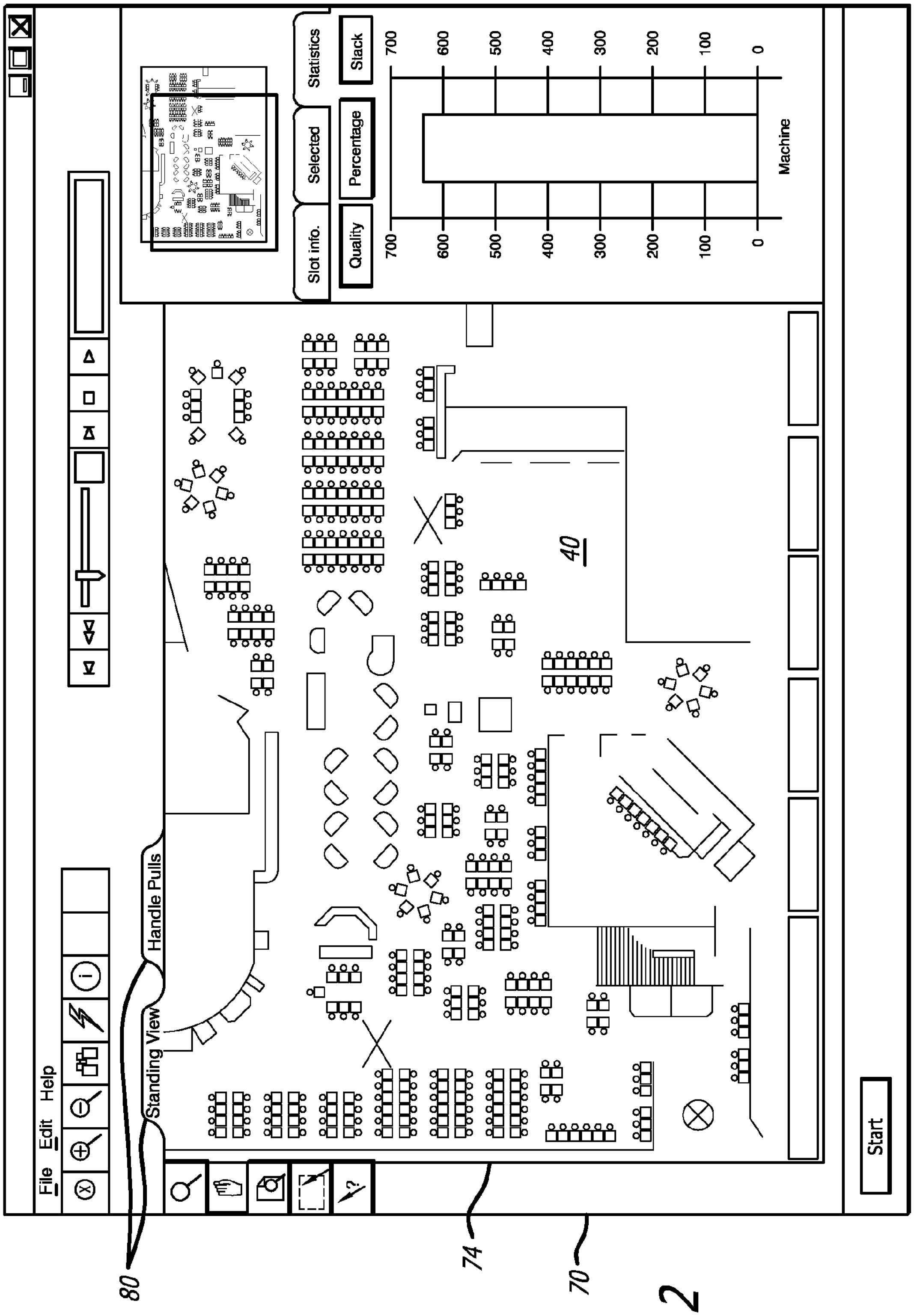
FIG. 2 illustrates a map of the casino gaming floor via the graphical user interface of the gaming-content configuration and management system.

Referring now to the drawings, wherein like reference numerals denote like or corresponding parts throughout the drawings, and more particularly to FIGS. 1-4, there is shown a preferred embodiment of gaming-content configuration and management system 10. Specifically, FIGS. 1 and 2 show a gaming-content configuration and management system 10 that enables configuration, management, and delivery of content on a game floor 40 from a computer 50 via a graphical user interface 70.

In a preferred embodiment, the system 10 is responsible for the configuration, management, and download of code 20 (i.e., content) to gaming devices 30 (e.g., gaming machines, gaming machine component, system components, network components, kiosks, signage, gaming-related devices, and the like) on the gaming floors 40 of incorporated gaming venues. Preferably, such gaming venues include casinos, Class II venues, and lottery venues. In one preferred embodiment of the gaming-content configuration and management system 10, gaming machines 30 and system components are incorporated into a broadband-networked gaming floor 40, instead of operating independently (or quasi-independently) as stand-alone platforms and basic monitoring systems.

As briefly mentioned above, in one preferred embodiment, the gaming-content configuration and management system 10 enables operators to manage the gaming floor 40 from a desktop computer 50 (or other portable computer or handheld device) via a graphical user interface 70 on the computer. Preferably, the gaming-content configuration and management system 10 is capable of administrating gaming floors 40 ranging in size from a single slot floor to a worldwide gaming enterprise. In a preferred embodiment, the system 10 administrates gaming devices 30 on floors 40 that are multi-platform 60, multi-theme, multi-percentage, and multi-denomination. Otherwise stated, in such an embodiment, each of the gaming devices 30 (or at least some gaming devices 30) incorporates multiple game platforms 60, incorporates multiple game titles (stored locally or remotely), is capable of being configured to generate multiple different payout percentages, and is capable of offering multiple different monetary denominations for game play. Central management of all these gaming options is enabled from the graphical user interface 70.

Figure 3:
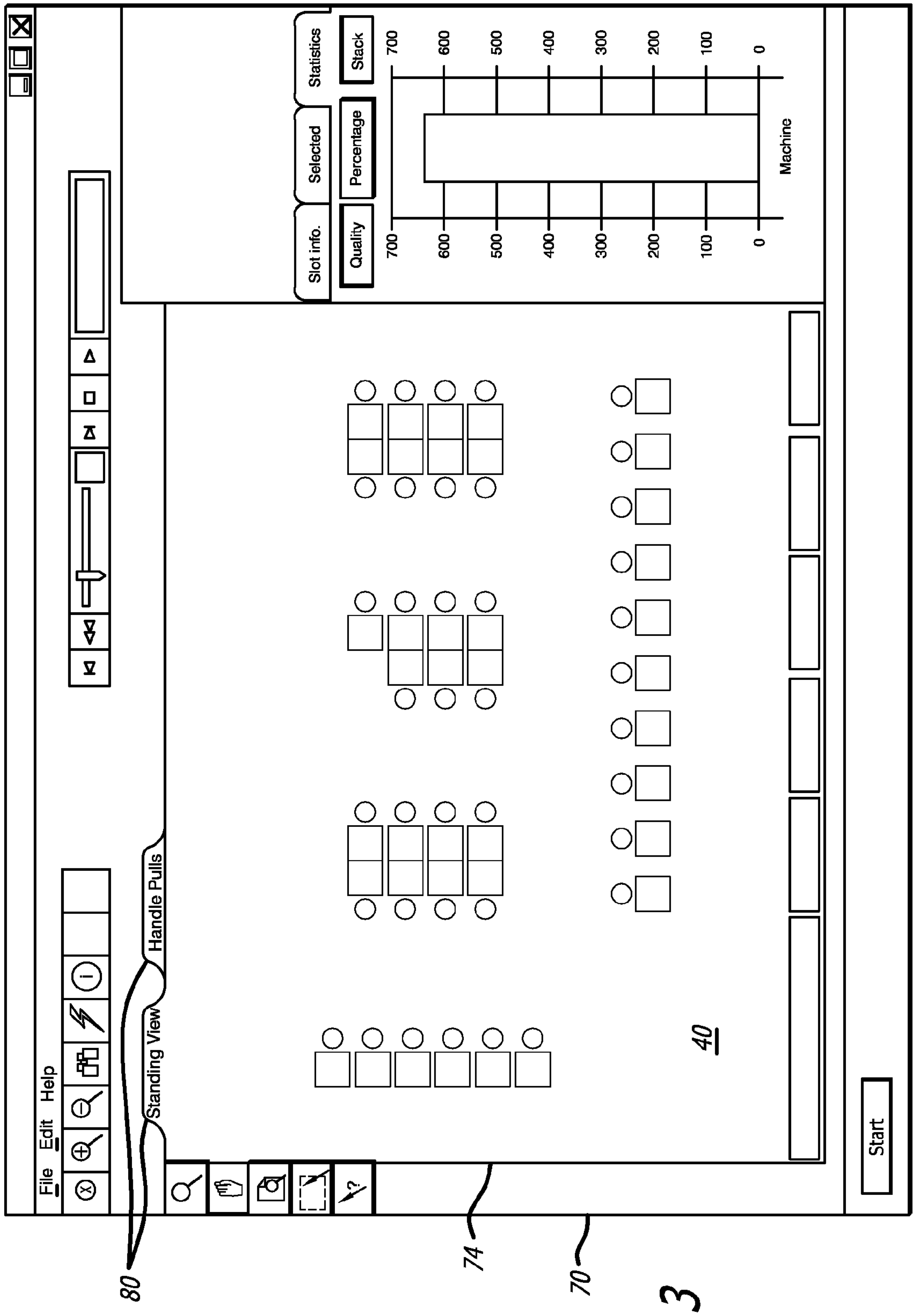
FIG. 3 illustrates another view of a map of the casino gaming floor via the graphical user interface of the gaming-content configuration and management system.

Accordingly, in a preferred embodiment of the gaming-content configuration and management system 10, a graphical user interface 70 is accessible via a gaming floor operator's computer 50. In such an embodiment, as shown in FIGS. 2 and 3, a graphical user interface 70 displays a map 74 of the slot floor 40. Preferably, this map 74 of slot floor 40 includes multiple selectable layers 80. Gaming-related information is organized by layer 80; with each layer displaying a different category of gaming-related information. In one specific, non-limiting embodiment, a first layer 80 displayed on the graphical user interface 70 shows game themes (i.e., game titles) that are currently populating the slot floor 40. Preferably, each game theme is emphasized with a distinct color in order to differentiate one game theme from another game theme. Continuing, in this specific, non-limiting embodiment, a second layer 80 of the map 74 displays information that relates to device volume settings. In this manner, each layer 80 displayed on the graphical user interface 70 presents different gaming-related information including, by way of example only, and not by way of limitation, coin-in activity, coin-out activity, meters, other accounting information, security information, and player rating information.

A preferred embodiment of the gaming-content configuration and management system 10 presents customers with a consistent, intuitive, front-end interface 70 to all incorporated gaming devices 30. Preferably, tabs at the bottom of the graphical user interface 70 direct the operator from the configuration manager screen to other screens that control backside servers and/or services including, by way of example only, and not by way of limitation: MCC server 90, SDG server 92, CMP server 94, MindPlay server 96, SDS server 98, ACSC server 100, and the like. In a preferred embodiment, the graphical user interface 70 for the gaming-content configuration and management system 10 is an "entry point" (i.e., front-end interface) for all incorporated gaming devices 30. As such, the graphical user interface 70 of the gaming-content configuration and management system 10 provides a consistent "look and feel" for the operator as they use associated products. This same look and feel of the graphical user interface 70 is expandable over time to include various methods of user access to other categories of information, such as accounting, cage, and security across all back office servers (e.g., MCC server 90, SDG server 92, CMP server 94, MindPlay server 96, SDS server 98, ACSC server 100, and the like).

Within each gaming platform 60 (e.g., Alpha, S6000, Game Maker 2, EVO3, and the like) the gaming-content configuration and management system 10 enables control of game theme (i.e., game title), game percentage payout, and game denomination. Thus, the configuration and management system 10 is able to control and manage a multi-platform 60, multi-theme, multi-percentage, and multi-denomination gaming floor 40. Additionally, a preferred embodiment of the gaming-content configuration and management system 10 also includes platform-specific control over functions such as the volume setting of the device, speed of play, hopper limits, and the like. Moreover, in a preferred embodiment, these functions further include, by way of example only, and not by way of limitation: access to logs, platform-specific reports, and asset information (e.g., software and hardware bills of material).

Thus, the configuration and management system 10 is capable of controlling game selection and gaming-related parameters, as well as controlling platform-specific functions. In a preferred embodiment of the configuration and management system 10, each gaming platform 60 has uniquely-controllable configurations, and the system 10 is capable of providing configuration and management control specific to each gaming platform 60. For example, the S6000 platform 60 sets and controls options in a different manner than the Alpha platform 60. In this regard, an Alpha platform 60 may have multiple methods for option setting (e.g., the platform may have a method for setting options for Class II gaming that is different from the method for setting options for Class III gaming). However, the configuration and management system 10 is capable of providing configuration and management control specific to each gaming platform 60.

In a preferred embodiment, the gaming-content configuration and management system 10 merges the capabilities of commercial system management products with the capabilities of commercial operating systems (e.g., Linux®, Windows®, or the like). Further, in one preferred embodiment, the gaming-content configuration and management system 10 is utilized in combination with the current SAS protocol, serial-based communication infrastructure. In one such embodiment, the gaming-content configuration and management system 10 employs several previously un-implemented poll codes contained in the SAS6.01 protocol. A preferred embodiment of the gaming-content configuration and management system 10, which utilizes this SAS protocol, serial-based communication network, (or similar non-SAS protocol, serial-based communication network) is referred to as Phase 1 of the configuration and management system 10.

In another preferred embodiment of the gaming-content configuration and management system 10, an IP-based (or other packet-based) communication network is implemented, which connects the gaming devices 30 in the system. An IP-based message set utilizes an interface layer between command-driven devices and logical communication channels. This embodiment of the gaming-content configuration and management system 10, which utilizes an IP-based (or other packet-based) network format, is referred to as Phase 2 of the configuration and management system 10. In one specific, non-limiting embodiment of a Phase 2 system 10, the Super-SAS protocol is implemented as the communication protocol. In another specific, non-limiting embodiment of a Phase 2 system 10, a different packet-based protocol (or other event-driven communication) is implemented as the communication protocol (TCP/IP, Frame Relay, and the like).

Referring again to Phase 1 of the gaming-content configuration and management system 10, in one preferred embodiment, the system modifies various platforms 60 (Alpha, S6000, GameMaker2) to enable selection of game theme (i.e., game title), game payout percentage, and game play denominations through the use of SAS6.01 commands. This configuration process enables platform-specific control over specific platform capabilities including, by way of example only, and not by way of limitation: volume setting of the device, speed of play, hopper limits, and the like.

In a preferred embodiment of Phase 1 of the gaming-content configuration and management system 10, the system identifies the configuration and control capabilities available in each gaming device 30, and targets those controllable capabilities remotely using the SAS6 protocol (or other non-SAS serial-based protocol). After identifying and targeting the available configuration and control capabilities, this protocol enables an administrator to configure and manage the existing systems, networks, gaming devices 30, and platforms 60 (e.g., NT+, Gearbox, MC250, GameNet, Alpha, Game Maker II, S6000, Mcc-Axiomtek, and SDG game controller).

Preferably, in the Phase 1 version of the gaming-content configuration and management system 10, the SAS6 configuration control "long polls" are implemented on all platforms 60. Additionally, any integrated networks and systems are modified to send these poll codes. Further, the graphic user interface 70 in the system 10 is configured to control these poll codes.

Specifically, targeted SAS6 poll codes include, by way of example only, and not by way of limitation: (A) Shutdown (lock out play); (B) Startup (enable play); (C) Sound off (all sounds disabled); (D) Sound on (all sounds enabled); (E) Reel spin sound disabled; (F) Enable bill acceptor; (G) Disable bill acceptor; (H) Configure bill denomination; (I) Enable/disable game n; (J) Set sound volume; (K) Play sound; (L) Enable/disable real time reporting; (M) Send gaming machine ID# and information; (N) ROM signature verification; (O) Send EFT log; (P) Send current hopper status; (Q) Send total number of games implemented; (R) Send game n configuration; (S) Send SAS version ID, gaming serial no.; (T) Send selected game number; (U) Send enabled game numbers; (V) Send authentication info; (W) Send current date and time; (X) Receive general ASCII message; (Y) Simulate user input; (Z) Send enabled features; (AA) Send cash out limit; (BB) Enable/disable game auto rebet; (CC) Send extended game n info; (DD) Send enabled player denominations; and (EE) Send extended game n info. Additionally, there are SAS general poll exception commands, such as: (A) Operator changed options (configuration options); (B) System validation request; and (C) Game locked.

Referring now to Phase 2 of the gaming-content configuration and management system 10, the Phase 2 system transitions from using SAS6 protocols (or other serial-based network format) to instead utilizing broadband communications (e.g., Ethernet, TCP/IP, or other packet-based network format). The Phase 2 of the gaming-content configuration and management system 10 also enables: (1) Web-based communications (e.g., BOB, SuperSAS, G2S, and the like), (2) access to logs and reports specific to the platform, and (3) downloading of new code and advertising content. Preferably, a SMS (Systems Management Server) client agent is also added to the platforms 60 in Phase 2 of the gaming-content configuration and management system 10.

In another aspect of a preferred embodiment, Phase 2 of the gaming-content configuration and management system 10 also includes the control and auditing of system configurations. For example, the reporting and settings options in a SDS server 98 are typically different than settings options in an MCC server 90, SDG server 92, or ACSC server 100. However, a preferred embodiment of the gaming-content configuration and management system 10 is able to control and audit each of these system configurations. In another aspect of a preferred embodiment, an iView device 30 is controlled by the gaming-content configuration and management system 10, which has setup and control options that are unique in each of the NT, Kontron board, and Mcc implementation.

In a preferred embodiment of the gaming-content configuration and management system 10, platforms 60 include Ethernet hardware, TCP/IP stacks, http stacks, SOAP (or the proprietary layer SuperSAS), and XML handling capability. Preferably, system management client agents for each platform and each system are employed. In one preferred embodiment, these elements are added to each platform and are "hooked" into the platform code in order to tie XML messages to game logic. In another aspect of one preferred embodiment that utilizes on Alpha platform 60, a SMS client for Linux is implemented in order to support the Alpha platform.

Referring again more specifically to FIGS. 2 and 3, in a preferred embodiment of the gaming-content configuration and management system 10, the graphical user interface 70 displays the slot floor (or multiple slot floors) to the gaming floor administrators on their computers 50. Specifically, the graphical user interface 70 preferably presents a map 74 of the gaming floor and incorporates the use of selectable layers 80 (for organizing information) and colors (for emphasizing information). The layers 80 are selectable in order to present various types of information by layer, including by way of example only, and not by way of information: occupancy, level of handle, sound level, heat, accounting, and performance measurements.

In one preferred embodiment, the graphical user interface 70 is extended to incorporate all user input screens. In this manner, users have a consistent "front-end" experience when working with any of the included user input screens, such as for the cage, accounting, security, and the like.

In one preferred embodiment of the Phase 1 system 10, information obtained from gaming devices 30 on the floor by the SAS6 protocol (or other suitable protocol) is translated by the graphical user interface 70 into a multi-dimensional graphic form that includes geographic location (e.g., country, state, facility, slot floor position, and the like) and value (e.g., hi, lo, medium, empty, full, and the like) which are preferably represented by different colors. As mentioned above, in a preferred embodiment, the graphical user interface 70 includes information on available game themes, game payout percentages, and available game play denominations. Further, the graphical user interface 70 not only displays this information, but also enables an operator to configure the gaming devices 30 on the gaming floor remotely from a computer 50 via the graphical user interface. In this manner, the graphical user interface 70 enables an operator to select a single gaming device 30, or a group of gaming devices 30, and change their configuration (theme, percentage, denomination, and the like). Additionally, the graphical user interface 70 preferably enables the scheduling of changes. Other configuration setting provided by SAS6 (or other suitable protocol) and the platforms 60 are also presentable and configurable via the graphical user interface 70.

In a preferred embodiment, the graphical user interface 70 of the Phase 1 system 10 is an analysis program that provides front-end, user interface functionality including, by way of example only, and not by way of limitation: data analysis tools, scheduling capabilities, and messaging resources for sending messages back to the slot system. In comparison, the graphical user interface 70 of the Phase 2 system 10 adds links into each of the expanded back office server offerings (e.g., MCC server 90, SDG server 92, CMP server 94, MindPlay server 96, SDS server 98, ACSC server 100, and the like), as well as network management capabilities. This graphical user interface 70 also enables expansion to other applications. Otherwise stated, the graphical user interface 70 of the Phase 2 system 10 becomes a "portal" through which casino executives have access to all properties services. In one specific, non-limiting preferred embodiment, a first tab is associated with slot floor analysis; a second tab is associated with network management (linking the user to a network management software application such as HP OpenView); a third tab is associated with whichever expanded system offerings (i.e., back office servers) the customer has implemented on the slot floor system (e.g., MCC server 90, SDG server 92, CMP server 94, MindPlay server 96, SDS server 98, ACSC server 100, and the like); and a fourth tab is associated with CMP (or SMS) for player marketing. In one preferred embodiment, the graphical user interface 70 is further expandable to include hospitality and POS links.

In a preferred embodiment, the gaming-content configuration and management system 10 performs content management of game code, data, and configuration. A preferred embodiment of a gaming-content configuration and management system 10 accommodates slot floor (or entire corporate organization) having from hundreds to tens of thousands of gaming devices 30. Further, a preferred system 10 is capable of controlling and managing multiple platforms 60 from multiple platform manufacturers. Additionally, a preferred system 10 is capable of controlling and managing multiple themes (i.e., game titles) on each platform 60. Moreover, a preferred system 10 is capable of controlling and managing multiple percentages and multiple denominations for each theme. In a preferred embodiment, each combination of "company/location/cabinet/theme/percentage/denomination" is defined herein as a gaming combination. In a preferred embodiment of a gaming-content configuration and management system 10, each gaming combination has a configuration that needs to be stored, monitored, and managed. Additionally, each gaming combination that is controlled and managed by the system 10 has associated configurations, assets, and logs. All of this data is stored and organized by the system 10 to provide users, regulators, and company personnel with access, management, and control capabilities.

In a preferred embodiment of the gaming-content configuration and management system 10, the process for signing content 20 is supported through the use of the SAS6 protocol (or other similar protocol). Preferably, the process for signing content 20 leverages the capabilities of the iView content signing procedures. Additionally, in a preferred embodiment of the gaming-content configuration and management system 10, a directory structure and filing system is implemented for game theme tables, platform options settings (configuration), and access logs that are enabled in SAS6. In one preferred embodiment, Microsoft Sharepoint Server is utilized as the directory structure and filing system. Preferably, Microsoft Server 2003 (or higher) is the server operating system (OS) for the gaming-content configuration and management system 10.

In a preferred embodiment of the Phase 2 system 10, all content 20 (e.g., platform OS code, game theme code, platform options-configuration, logs by cabinet, advertising content-skins, and the like) is securely stored at a level sufficient to satisfy gaming regulators. These security measures include, by way of example only, and not by way of limitation, physical security requirements, access requirements, logging requirements, and update requirements. In a preferred embodiment of the Phase 2 system 10, the procedure for authenticating code 20 with gaming regulations is to require a server to meet the same compliance requirement as a gaming device 30. In this manner, the server (and contained code) is subject to corresponding gaming device regulations. For content 20 such as options-configurations and advertising content (e.g., skins), an authentication procedure is implemented that links the production of new content into storage and subsequent authentication signing.

In another aspect of a preferred embodiment, the gaming-content configuration and management system 10 further includes a distribution management component. Briefly stated, the distribution management component transmits bulk data from a backend server to the gaming floor. Movement of large files to particular platforms 60 on the floor must be performed without disrupting the primary use of the gaming floor (i.e., making money through the support of gaming-related transactions). Thus, large files of bulk data are moved "in the background" over otherwise unused network bandwidth so as not to adversely affect gaming-related transactions.

Accordingly, in a preferred embodiment of the gaming-content configuration and management system 10, platforms 60 (i.e., clients) and systems (i.e., servers) are capable of downloading large files of bulk data while game play is in progress. Preferably, this download process is schedule-able and monitor-able using the distribution management component. Typically, downloading of large files (or upload of large files such as logs) takes a large amount of time (on the order of hours, days, or long periods of time). In a preferred embodiment, the download is performed at the request of the client (i.e., the platform 60). As such, the client and network load combine to determine the proper time and speed for a download (or upload) to take place. In a preferred embodiment of the gaming-content configuration and management system 10, the server accommodates download scheduling, ensures minimal bandwidth impact, enables progress reporting, and guarantees delivery, as well as setup and management of the download (or upload) process.

In a preferred embodiment of the Phase 1 system 10, floor control is limited to the configuration changes that are possible through SAS (or other equivalent protocol). As such there is no additional distribution management functionality in the Phase 1 system 10. However, the broadband networking utilized in a preferred embodiment of the Phase 2 system 10 does implement distribution management features. In one preferred embodiment, when the content 20 is stored on alterable media (e.g., a local hard drive, FLASH memory, and the like) in the platform 60 (Alpha, iView, Game Maker II, G2S, and the like), command protocols such as GSA BOB v1.01 can be used for enabling and disabling gaming combination. In one preferred embodiment of the Phase 2 system 10, operators are able to modify these configuration elements (i.e., gaming combinations) in real time. In one specific, non-limiting embodiment, the server communicates in the GSA BOB v1.01 command protocol to the slot floor.

Continuing, in a preferred embodiment of the gaming-content configuration and management system 10, distribution management includes, by way of example only, and not by way of limitation: (1) the act of downloading new advertising content 20 to an iView device 30 or gaming platform 60 (2) sending down code 20 or operating system updates, and (3) sending down a new game theme (i.e., game title). New game themes are typically large files that can range from around 400 Kilo-bytes to over 4 Giga-bytes in size. Code updates are typically smaller files that range from around 20 Kilo-bytes to 400 Mega-bytes in size.

In one specific, non-limiting embodiment, a slot director uses the gaming-content configuration and management system 10 to schedule a download (or upload) and check on the progress of the download. For example, in one scenario, the system 10 rolls out a large new game theme across a casino floor to several hundred cabinets 30 over several days. Downloading such a game theme "in the background" to a gaming machine fulfills Class III regulations, provided that (1) the content 20 is downloaded into an "escrow" area where the content cannot affect game play, and (2) an authentication process is performed on the newly-downloaded content. In some situations, installation and use of the downloaded theme/content 20 may require physical intervention, an initiating event, and/or approval to fulfill Class III regulations (e.g., using a key switch, BKEY, or the like), depending upon the jurisdiction.

In one preferred embodiment, an initiating event includes, by way of example only, and not by way of limitation: (1) no credits on the game meters, (2) no activity at the game, game play, button pushes, card-ins, printing, and the like, (3) a period of time with no activity at the game, (e.g., 5 minutes, 10 minutes, or the like), (4) a key insertion or card insertion by an employee, (5) accessing of a special setup screen on the game by an authorized person, (6) touching a button or activation point on the screen in response to a message saying the new code is ready to load, (7) a button push or activation by an operator on the casino backend, (8) a tie-in to a video system to confirm there is no player at the game and the initiation can take place, (9) a biometric entry at the game or at the system that authorizes initiation of the code, and (10) a key opening and BKEY (electronic key) entry to authorize installation or reconfiguration of the software.

In one preferred embodiment of the gaming-content configuration and management system 10, the distribution management is performed using Microsoft SMS on the server, iView device 30, and Game Maker II. In another preferred embodiment, WBEM (Web Based Enterprise Management) is implemented, which provides an open-source option for LINUX, AIX, UNIX, AS400, and homegrown clients. The distribution management abilities of the configuration and management system 10 enable other game manufacturers or system manufacturers to be monitored and controlled by the management server of the system 10, which is typically required for lottery and casino monitoring systems. Additionally, the distribution management client software utilized in the system 10 is adaptable and/or accessible to other manufacturers.

As mentioned above, in a preferred embodiment of the system 10, a key feature of distribution management is to ensure availability of the network for gaming transactions (i.e., device management may not dominate the bandwidth of the network). Another important aspect of a preferred embodiment is flexibility in the deployment of distribution management system and scalability of the system. Otherwise stated, the ability to use the same distribution management system in multiple situations. Such situations include, by way of example only, and not by way of limitation: (1) a point-to-point distribution management situation in which a laptop (or other portable computing device) connects to a single device 30 or a small number of devices; (2) a property-based distribution management situation in which the management server controls a single property (with anywhere from 100 to 30,000 devices 30 in a local installation), and (3) a wide area network distribution management situation in which hundreds to thousands of devices 30 are connected over a combination broadband network and/or dial-up facilities.

In one preferred embodiment of the gaming-content configuration and management system 10, the data transport is a switched, managed IP network of at least 100 Mbps. Preferably, each endpoint in the network is monitor-able and controllable. With respect to another preferred embodiment, the distribution management system operates over a data transport based upon POTS (plain old telephone system).

Referring now to another aspect of the gaming-content configuration and management system 10, the device management component is the client companion component to the distribution management component discussed above. One preferred embodiment, the system 10 utilizes a common server-based distribution engine that communicates with a wide range of "clients" including, by way of example only, and not by way of limitation: the LINUX-based Alpha platform; the CE-based iView platform; the XPe based Game Maker II platform; and other proprietary platform operating systems (e.g., QNX, home grown, and the like). The device management component of gaming-content configuration and management system 10, also includes systems products, including by way of example only, and not by way of limitation: Windows server, AIX, UNIX and AS400.

In one preferred embodiment, since the Phase 1 system 10 enables floor control through configuration changes in SAS protocol (or other equivalent protocol), all current platforms 60 are configured to respond to these SAS poll codes. As such, in the Phase 1 system 10 poll codes are implemented and/or modified in their response as needed.

Referring now to the Phase 2 system 10, in one preferred embodiment Microsoft SMS provides all of the necessary client components. In another preferred embodiment, WBEM (Web Based Enterprise Management) is implemented, which provides an open-source option for LINUX, AIX, UNIX, and AS400 clients.

In preferred embodiments of the gaming-content configuration and management system 10, the network infrastructure differs depending on whether Phase 1 or Phase 2 of the system is being implemented. In a preferred embodiment of the Phase 1 system 10, the system is implemented over existing networks using SAS poll codes (or another equivalent protocol). In a preferred embodiment of the Phase 2 system 10, the system is implemented over a broadband network and employs new message protocols (e.g., BOB, SuperSAS, G2S, or the like). In one preferred embodiment, the network is constructed using copper or fiber optics. Additionally, the network may include wireless, VPN, and/or long-haul components. In a preferred embodiment, the system 10 uses a fully-switched network in which each port (down to the individual terminal 30, game, platform 60, and/or iView device 30) is monitored and controlled.

Due to increasing threats from hacking and other security issues, gaming regulations in Class 3 jurisdictions dictate the use of strong cryptographic authentication of code running on gaming platforms. As such, a preferred embodiment of the gaming-content configuration and management system 10 has adopted cryptography and security standards in order to help ensure operational efficiency and inter-operability with other products. In this regard, PKI (public key infrastructure) is the root of a common, systematic approach to security and authentication for the configuration and management system 10. In a preferred embodiment, code 20 is signed and authenticated on platforms 60 using a root authority with subsidiaries that meet the highest cryptographic standards and employ industry standards.

Figure 4:
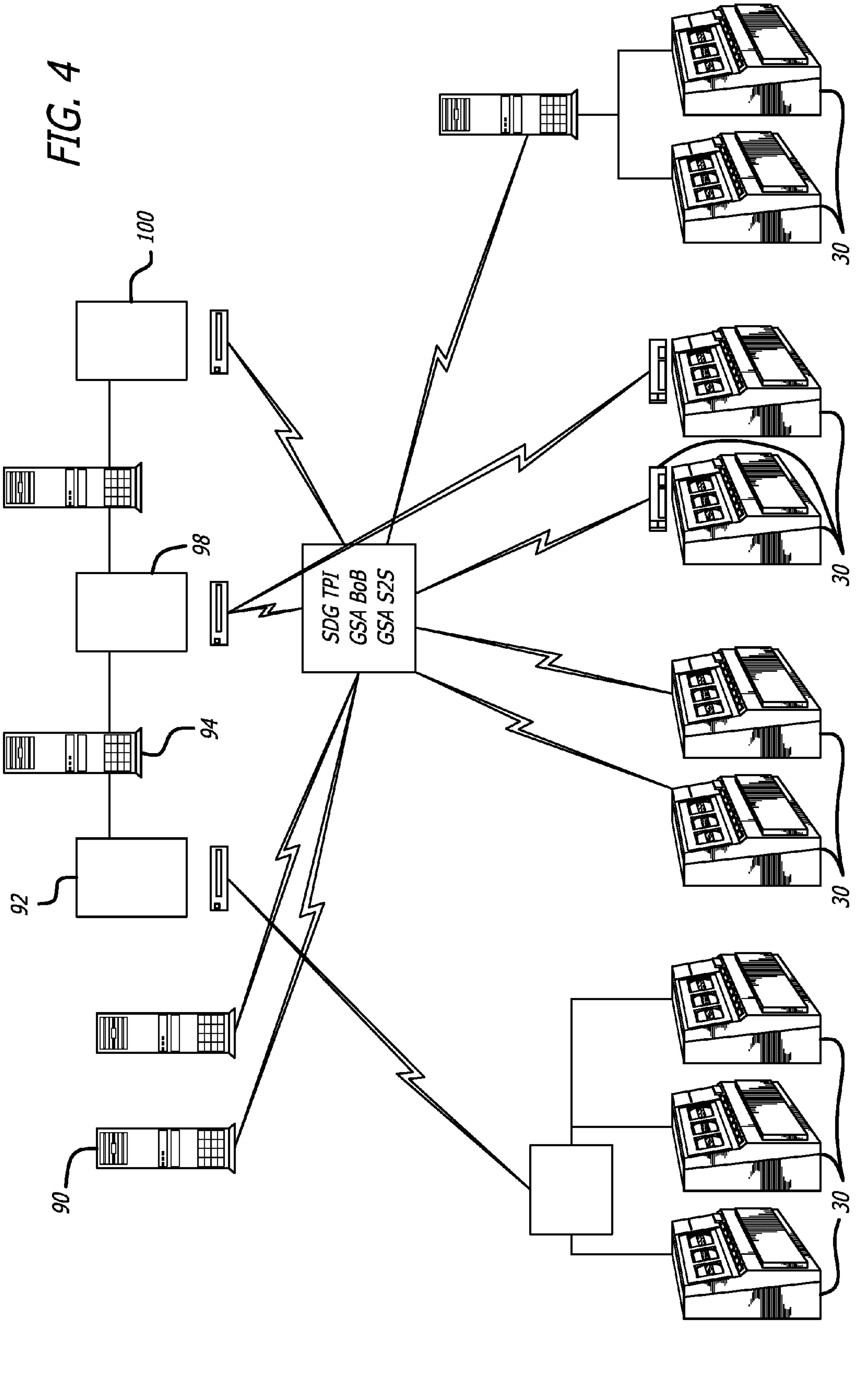
FIG. 4 illustrates a relational diagram of protocols implemented by a gaming-content configuration and management system for controlling and managing a gaming system that includes gaming devices on a casino floor connected through networking equipment to multiple tiers of servers on the casino backend.

Referring now to FIGS. 1 and 4, the iView device 30 of a preferred embodiment of the gaming-content configuration and management system 10 is shown. Prior to the advent of the iView device (described above), gaming regulators would have been unwilling to allow casino operators to design their own content. However, due to the cryptographic technology implemented by the embedded processor in the iView device 30, a certification process is provided by the system 10 with sufficient security for gaming regulators to allow casino operators to design their own content. Specifically, in one preferred embodiment, the certification process offered ensures authentication and non-repudiation of the casino operator designed web content. Preferably, in the configuration and management system 10, the certification process provided further ensures auditability and traceability. Various cryptographic technologies, such as authentication and non-repudiation (described herein below), are utilized in preferred embodiments of the system, to provide sufficient security for gaming regulators to allow casino operators to design their own content.

In one preferred embodiment, this certification process is used to certify "signed content" (created by the casino owners) in the same manner that a "signed program" is certified. Preferably, PKI (Public Key Infrastructure) is utilized in the certification process. PKI is a system of digital certificates, Certificate Authorities, and other registration authorities that verify authenticity and validity. In one preferred embodiment, a "new tier" or derivative PKI is created that is rooted in the primary PKI and that leverages the capabilities of the certificate (e.g., a x509 certificate) that allow for limited access. Thus, this preferred embodiment allows the attributes within the certificate to be used to provide "levels" of code access and acceptance in the gaming industry.

In one embodiment, the content is protected by digital signature verification using DSA (Digital Signature Algorithm) or RSA (Rivest-Shamir-Adleman) technology. In this regard, the content is preferably protected using digital signature verification so that any unauthorized changes are easily identifiable. A digital signature is the digital equivalent of a handwritten signature in that it binds a trusted authority's identity to a piece of information. A digital signature scheme typically consists of a signature creation algorithm and an associated verification algorithm. The digital signature creation algorithm is used to produce a digital signature. The digital signature verification algorithm is used to verify that a digital signature is authentic (i.e., that it was indeed created by the specified entity). In another embodiment, the content is protected using other suitable technology.

In one preferred embodiment, a Secure Hash Function-1 (SHA-1), or better, is used to compute a 160-bit hash value from the data content or firmware contents. This 160-bit hash value, which is also called an abbreviated bit string, is then processed to create a signature of the game data using a one-way, private signature key technique, called Digital Signature Algorithm (DSA). The DSA uses a private key of a private key/public key pair, and randomly or pseudo-randomly generated integers, to produce a 320-bit signature of the 160-bit hash value of the data content or firmware contents. This signature is stored in the database in addition to the identification number.

In another preferred embodiment, the system utilizes a Message Authentication Code (MAC). A Message Authentication Code is a specific type of message digest in which a secret key is included as part of the fingerprint. Whereas a normal digest consists of a hash (data), the MAC consists of a hash (key+data). Thus, a MAC is a bit string that is a function of both data (either plaintext or ciphertext) and a secret key. A Message Authentication Code is attached to data in order to allow data authentication. Further, a MAC may be used to simultaneously verify both the data integrity and the authenticity of a message. Typically, a Message Authentication Code (MAC) is a one-way hash function that takes as input both a symmetric key and some data. A symmetric-key algorithm is an algorithm for cryptography that uses the same cryptographic key to encrypt and decrypt the message.

A Message Authentication Code can be generated faster than using digital signature verification technology; however, a Message Authentication Code is not as robust as digital signature verification technology. Thus, when speed of processing is critical, the use of a Message Authentication Code provides an advantage, because it can be created and stored more rapidly than digital signature verification technology.

In one preferred embodiment, the authentication technique utilized is a BKEY (electronic key) device. A BKEY is an electronic identifier that is tied to a particular trusted authority. In this manner, any adding, accessing, or modification of content that is made using a BKEY for authentication is linked to the specific trusted authority to which that BKEY is associated. Accordingly, an audit trail is thereby established for regulators and/or other entities that require this kind of data or system authentication.

Another preferred embodiment of the verification system utilizes "component bindings" for verification using cryptographic security. In component binding, some components come equipped with unalterable serial numbers. Additionally, components such as web content or the game cabinet may also be given another random identification number by the owner. Other components in the system, such as the CMOS memory in the motherboard, the hard drive, and the non-volatile RAM, are also issued random identification numbers. When all or some of these numbers are secured together collectively in a grouping, this protected grouping is referred to as a "binding." Each component of the machine contains its portion of the binding.

In one such preferred embodiment, every critical log entry made to the content is signed with a Hashed Message Authorization Code (HMAC) that is based on the entry itself, and on the individual binding codes. In this manner, the security produced by the bindings ensures that log entries that are made cannot be falsified or repudiated.

After the critical gaming and/or system components are selected, given individual identifiers, and combined into a protected grouping that is secured using the component "bindings," any changes to those components will then be detected, authorized, and logged. For example, content within the binding is digitally signed (SHA-1) using the key derived from the bindings. This signature is verified whenever an entry is made to a component within the binding. If the signature is wrong, this security violation and the violator are noted, but typically the entry is not prohibited. In other embodiments, the entry may be prohibited as well. Thus, the component binding produces a cryptographic audit trail of the trusted authority making changes to any of the components within the binding.

Moreover, bindings ensure that the critical components of a gaming machine system, or the content utilized therein, that have been selected to be components within the binding have not been swapped or altered in an unauthorized manner. Preferably, bindings use unique identification numbers that are assigned to vital parts of the gaming platform including, by way of example only, and not by way of limitation: the cabinet, motherboard, specific software, non-volatile RAM card, content (data), and hard drive. These identification numbers combined in a cryptographic manner to form a "binding" that protects and virtually encloses the included components, such that no component within the binding can be modified, removed, or replaced without creating an audit trail and requiring authentication. Thus, for one of these components within the binding to be changed, appropriate authentication is required and a log file entry is made documenting the activity and the identity of the trusted authority making the change. In one preferred embodiment, a specific level of BKEY clearance or classification is required to make specific changes.

As briefly described above, gaming devices 30 also includes signage and kiosks, in addition to gaming machines, GMUs, and iView devices. In this regard, gaming-related signage relates to advertising signage that is typically in a reconfigurable electronic format. In this context, gaming-related kiosks are machines that provide gaming-related service but do not provide actual game play itself. Gaming-related kiosks may include both patron-oriented services and maintenance-oriented features. In one embodiment, patron-oriented services include the ability to sign on to rewards services, view account status and history, redeem payout tickets and promotional "comps," request help from an attendant, order drinks, make dinner reservations, reserve taxis, purchase show tickets, conduct banking transactions, and the like. Maintenance-oriented features include providing information such as coin-in, coin-out, malfunctions, jackpots, tilt conditions, game software version, and the like.

As described below, an iView device is an embedded additional user interface, which is preferably integrated into a gaming machine and acts to increase user excitement by providing a richer gaming experience. An embedded additional user interface provides enhanced player satisfaction and excitement, as well as improved gaming device reliability, interactivity, flexibility, security, and accountability. The user interface is sometimes referred to herein as "additional" in that the user interface is separate from the gaming screen (or other gaming presentation). Further, the user interface is sometimes referred to herein as "embedded" in that the user interface includes its own processor in some preferred embodiments.

In one preferred embodiment, the gaming-content configuration and management system 10 contains a datastore that includes, by way of example only, and not by way of limitation: a relational database, object database, a flat file, an ASCII list, registry entries, an XML file, a "collection" (i.e., in a SQL (structured query language) environment, a collection of parameter defined data in an object database), or any other type of commonly known data listing. In such a preferred embodiment, the computer datastore enables the system 10 to sort gaming devices 30 by feature, whether the gaming devices are electronic gaming machines (EGMs), GMUs, iViews (embedded additional user interfaces), or any other uniquely identifiable entity on the gaming floor. In one aspect of a preferred embodiment, the gaming devices 30 being tracked and/or sorted include a download feature that is sortable according to: (a) the make/model of the gaming device that the download feature is associated therewith, (b) the device's hardware revision, (c) the device's firmware revision, (d) the physical location of the gaming device on the property, (e) zoning of the gaming device (e.g., high roller zone), (f) game type (e.g., mechanical, electrical, dual screen, and the like), (g) dynamic gaming state or state change (e.g., payout, malfunction, "game in use," offline, tilt, jackpot mode, turned off, authentication failure, security breach, downloading content, installing content, and the like), (h) IP (Internet Protocol) address or (i) other suitable sorting feature, such as MAC addresses.

In one exemplary embodiment, all gaming devices 30 in a particular group can then be targeted for a specific code download. Accordingly, in one specific embodiment, all GMUs with a particular code revision can be identified and upgraded while those GMUs outside of the group are ignored. In another example, all iView devices installed into gaming machines that are located in a particular physical location on the property (i.e., a particular bank of games) are identified, and receive downloaded content which is then authenticated, after which they are reconfigured. Meanwhile, all of the iView devices outside of that grouping are ignored.

As mentioned above, the computer datastore of the gaming-content configuration and management system 10 is capable of utilizing these sorting and grouping capabilities for the purpose of inventory management. In this regard, a property (e.g. casino) is able to maintain up-to-date information on gaming floor inventory for a multitude of inventory parameters. These inventory parameters include, by way of example only, and not by way of limitation, the name of the iView device, the hardware revision of the iView device, the firmware revision of the iView device, the content of the iView device, the make/model of the GMU, the hardware revision of the GMU, the firmware revision of the GMU, the make/model of the gaming machine, the hardware revision of the gaming machine, the firmware revision of the gaming machine, and the physical location of the gaming machine.

In one preferred embodiment, the gaming-content configuration and management system 10 either queries the datastore containing all of the gaming device inventory data. The gaming-content configuration and management system 10 then sorts the data according to one or more user-input parameters. After the sorting has occurred, the user can, for example, download new content 20 to the iView devices, once the devices have been identified and targeted.

In a preferred embodiment of the gaming-content configuration and management system 10, since the device data resides on a central computer datastore, standard binary datastore searches can be performed to produce specifically desired reports. However, in one preferred embodiment, a distributed datastore is used instead of a centralized datastore. In one particular example, an analyst may be interested in the effectiveness of one piece of content (content X) compared to another piece of content (content Y) in a particular brand of gaming machine. Using the configuration and management system 10, the analyst can perform a datastore query on various parameters of the gaming devices, for example, the "coin-in" count on all Blazing 7's style gaming machines with iView gaming devices running content version X and content version Y. In this manner, the configuration and management system 10 enables specialty reporting, efficiency analysis, and gaming device management with a level of organization and simplicity that was never before possible.

In another preferred embodiment, the standard binary datastore searches are performed to produce other specifically desired reports, such as predictive analysis and yield management. In one embodiment, the yield management data includes projection data calculated based on one or more factors related to use of one or more gaming machines. For example, in one preferred embodiment, the yield management data includes game play projection data, machine usage projection data, and/or income projection data calculated based historical game play data for the one or more gaming machines. In one preferred embodiment, the calculations are performed using linear regression analysis. In another preferred embodiment, the calculations are performed using a neural network. In one embodiment, yield management data is used to determine one or more bonuses.

A preferred embodiment of the gaming-content configuration and management system 10 incorporates a yield management feature for the purpose of optimizing floor drop using configuration control over slot machines. The yield management feature of the configuration and management system 10 implements configuration control by setting optionable parameters including, by way of example only, and not by way of limitation: wager, theme, percentage and time in play. The analysis and predictive results are displayed using the graphical user interface 70 presents a map 74 of the gaming floor, preferably, with click and grab ease of planning and scheduling new gaming configurations.

A preferred embodiment of the gaming-content configuration and management system 10 provides automation and future-looking guidance to slot directors in configuring parameters for slot machines in order to optimize floor drop over some period of time: hour, day, week, month, year using inputs, including by way of example only, and not by way of limitation: accounting, time of day, civic, news and entertainment events, and player status.

As mentioned above, a preferred embodiment of the gaming-content configuration and management system 10 includes a graphical user interface 70 to simplify the use of these complex tools. The graphical user interface 70 presents a map 74 of the gaming floor that makes the yield management results clear and comprehensible to those not highly skilled in the art of yield management. Further, the graphical user interface 70 of the gaming-content configuration and management system 10 accepts input to the yield management feature, thereby allowing a casino operator the personalized control to manage the yield management process in the most logical/understandable/comprehensive manner. The input parameters and requirement for the graphical user interface 70 are also configured to be allowable subject to the gaming regulations for the relevant jurisdiction.

A preferred embodiment of the gaming-content configuration and management system 10 is able to analyze, automate, schedule, and control the options, operation, and configuration for thousands of machines. The configuration and management system 10 is capable of providing this control from a single property to many properties that may span states, countries, and even throughout the world. Preferably, a map 74 is presented via the graphical use interface 70 of the system 10, which is used to present information to a casino administrator in an easily understandable format. In this manner, a casino administrator is able to see historical results and then schedule changes in the slot floor using the map 74, presented via the graphical use interface 70.

In one preferred embodiment, the configuration and management system 10 is capable of applying the yield management feature to an individual player. In another aspect of a preferred embodiment, the configuration and management system 10 utilizes two forms of yield management in combination (i.e., physical groupings combined with individual player performance and monitoring).

In one preferred embodiment, yield management feature of the configuration and management system 10 is configured to optimize casino profitability. In one specific, non-limiting preferred embodiment, casino profitability is represented by the formula:

$$CP = \sum_{time} (OP - OE)$$

Where:

CP=Casino Profit

OP=Operations Profit

OE=Operations Expenses

Additionally, in one preferred embodiment of the configuration and management system 10, time is a variable in yield management calculations. Further, it should be noted that operational expenses are included in the above casino profitability formula. In a preferred embodiment, many aspects of operations performance are captured in the systems and messages. An additional aspect of the configuration and management system 10 involves applying yield management principles to operational efficiency issues, thereby further increasing casino profitability.

In a preferred embodiment, each element of the operations profit formula (shown below) can be broken down and the principles of yield management applied. For the casino slot floor the operations profit, OP, can be broken into:

$$OP = \sum_{time} (POSP + SFD)$$

Where:

POSP=Point Of Sale Profit (includes hotel, retail, food and beverage and entertainment)

SFD=Slot Floor Drop

Continuing:

$$SFD = \sum_{time} (PL - promotions)(RETURNVISIT)$$

Where:

RETURNVISIT=probability that the player will return to the casino.

PL=Player Loss

Promotions=marketing money the casino contributes to player kickbacks, comps, and system games.

Still continuing:

PL=ST*GCT*HPC*WAGER

Where:

ST=time the player spends at the slot machine, i.e., seat time

GCT=Game Cycle Time

HPC=Hold Percentage for the game

Further continuing:

WAGER=LINESBET*CREDITS*DENOM

Where:

LINESBET is the number of lines on which the player is betting.

CREDITS is the number of credits the player chooses to bet.

DENOM is denomination, i.e., the worth of an individual credit.

It should be noted that LINESBET, CREDITS, and DENOM can each be set to a minimum and are option-able parameters. As such, LINESBET, CREDITS, and DENOM are each under yield management control. Interestingly, changes in parameters within the PL (Player Loss) formula above can have a significant effect. Even if PL (Player Loss) is held constant, other element can still be modified within the formula. For example, GCT (Game Cycle Time) could be reduced by half while ST (Seat Time) is doubled. In this scenario, the player spends much more time at the game. Accordingly, such a players' chances of winning a progressive or system game are increased. Continuing this example, during slow times for the casino the above-described configuration change provides a method for the casino operator to enhance the attractiveness of the games to players without adversely compromising player loss or modifying progressive rules or systems games. The capability of the configuration and management system 10 provides a distinct advantage over prior gaming systems, in that no regulatory review of "new game rules" (i.e., new game configuration) is required.

A preferred embodiment of the configuration and management system 10 includes the capability to link the above-described changes to marketing programs such as mailings, advertisements, phone calls, other marketing methods, and the like. In addition, configuration and management system 10 includes a linkage to system game operation and individual yield management, as described above.

In one preferred embodiment of the configuration and management system 10, the yield management feature of the system 10 includes the ability to advertise, annunciate, and/or otherwise alert the player that yield management configuration change has occurred. Otherwise stated, in one specific, non-limiting embodiment, when the player sits at a gaming machine and is identified, the configuration and management system 10 annunciates to the player, "you are at 98% payback." In one preferred embodiment, such an announcement is made and maintained for the player to observe through at least one game cycle.

In another aspect of a preferred embodiment of the configuration and management system 10, the yield management parameter modifications are applied interactively as the casino operates. For example, in one specific, non-limiting embodiment, every fifteen minutes, the "forward looking" algorithms for yield management operation note that a particular carousel is being heavily played. In such an embodiment, yield management parameters (e.g., minimum bet and the like) are then immediately modified on those gaming cabinets (in the carousel) that are not currently in play. Thus, any new players joining the "hot" carousel are joining into game play that has had "tighter" yield management parameters applied. Accordingly, in such an example, those gaming patrons already on the "hot" carousel who have been a part of creating the "hot" feeling are at an advantage to those players joining later.

Likewise, in another specific, non-limiting embodiment, if the "forward-looking" algorithms for yield management operation detect that a carousel is "cooling," then yield management parameters (e.g., denomination and the like) can be immediately lowered or modified for ALL players. In this manner, those loyal players receive the same reward as new players joining the "action." Moreover, from a regulatory standpoint, relaxing yield management parameters on players during a gaming session is viewed far less restrictively than tightening yield management parameters on players during a gaming session. In this regard, in one preferred embodiment, tightening yield management parameters on players requires at least an announcement (and possibly active acceptance of the modifications by the player), and more commonly instituting the above configuration changes between player sessions.

In a preferred embodiment of the configuration and management system 10, the yield management feature necessitates an audio and/or visual announcement to the players that yield management parameters have been changed. In this regard, parameter changes in the players' favor may be displayed on the game screen, presented in the systems interface (iView-type device), announced by sound and/or the like. As explained above, parameter changes that are not in the players' favor (i.e., changes that tighten yield management parameters on the players) typically require higher levels of announcement to the players and possibly active acceptance of the modifications by the players.

Referring again to the formula above, slot floor drop, the parameter RETURNVISIT (probability that the player will return to the casino) is a significant term. In a preferred embodiment of the configuration and management system 10, yield management accounts for the importance of maximizing the RETURNVISIT probability, while at the same time maximizing SFD (Slot Floor Drop, i.e., the money collected). In a preferred embodiment of the system 10, a balance between these two elements is significant, and advantageously, is customizable by a casino administrator through the use of the yield management feature of the configuration and management system 10.

In a preferred embodiment of the system 10, the yield management feature enables cyclic patterns to be identified in order to both increase operator profitability and optimize player satisfaction, and thus return visits. Such factors, which are examined by the yield management feature in determining such cycles include, by way of example only, and not by way of limitation: demographics, weather, and entertainment events. In a preferred embodiment of the system 10, use of the yield management feature enables casinos that have implemented the system 10 to provide a much more personalized and individualized gaming experience.

In another aspect of a preferred embodiment of the system 10, the yield management feature combines individual player performance over time with gross property-wide yield management information. This combination gives each player their own unique play characteristics. In this regard, individualized characterization, control, and promotion are prominent features of such an embodiment. By combining yield management with player information, the system 10 enables customization of the game offerings specific to that customer.

Thus, in one specific, non-limiting embodiment, if a game cabinet holds fifteen game themes (i.e., game titles), only those game themes that the yield management predicts are most attractive to the player will be presented. Preferably, this extends to new game offerings as well, so that when new game themes are introduced, the yield management feature predicts if a particular player might like this new game theme, provides that game theme to the player, and announces to the player the existence of the new game theme. Additionally, as described above, parameters such as wager, game cycle time, and percentage can be set by the system 10, based upon player characteristics and overall yield management parameters.

In another specific, non-limiting embodiment of the configuration and management system 10, if the "forward-looking" yield management algorithms predict over 80% occupancy then GCT (game cycle time) is reduced, thereby increasing profitability. Moreover, if indications are that occupancy will remain over 80%, then yield management can move to adjusting WAGER to higher minimums. In one preferred embodiment, this adjustment might take the form of changing minimum lines, minimum credits, or denomination. As described above, the yield management feature of the configuration and management system 10 has a wide area of variables for affecting and adjusting slot floor profit.

In a preferred embodiment, the yield management aspect of the configuration and management system 10, coordinates game performance data from multiple input sources into an analytic engine. The sources include, by way of example only, and not by way of limitation: (1) slot data accounting, (2) multi-game cabinet accounting, (3) player tracking data, comps, (4) hotel, (5) point of sale system data, (6) location, (7) game mix nearby, (8) entertainment data, (9) weather, (10) off site user group demographic data, and (11) grouping of players, including the monitoring of those groups and presentation of bonusing specific to that group.

In accordance with a preferred embodiment of the system 10, the regulatory rules that allow control over gaming devices by electronic means are (1) GLI-21, and (2) NVGCB Proposed System Based and System Supported gaming regulations. Gaming devices with one or more modifiable parameters affecting yield management calculations include, by way of example only, and not by way of limitation: (1) theme, (2) wager (a) minimum bet, (b) maximum bet, (c) minimum lines bet, and (d) denomination, (3) percentage, and (4) play time, (a) spin cycle time, and (b) bonus round time.

In a preferred embodiment of the system 10, the uses of the yield analysis feature, include by way of example only, and not by way of limitation: system-games, gaming user groups, casino gaming areas, casinos and multi-property gaming, base game play of relating system-games, and modification of system-game operation for optimization of overall property profitability. In another aspect of a preferred embodiment of the system 10, the yield analysis feature includes predictive analysis engine for optimizing any desirable parameter (e.g., drop or occupancy during some future time). In one preferred embodiment of the system 10, the yield analysis feature includes an automation system for aiding and advising slot floor managers in the optimal configuration of a casino floor, including individual parameterization of slot machines.

A preferred embodiment of the yield management aspect of the system 10 is directed towards manipulation of gaming device parameters including, by way of example only, and not by way of limitation: wager, theme, percentage, and time in play to provide optimal casino profitability based upon predictive modeling. Additionally, in another aspect of a preferred embodiment, predictive modeling includes parameters related to player, property occupancy, time of day, week, month, year, events, weather, demographics, and other similar parameters.

Another preferred embodiment of the yield management aspect of the system 10 is directed towards linkage of yield management manipulation of gaming devices 30 with player-targeted marketing, including advertisements and inducements from casino to patrons. Still another preferred embodiment the yield management aspect of the system 10 is directed towards notifying a player for at least one game cycle that a yield management parameter has been modified on the gaming device being used by the player. Moreover, yet another preferred embodiment the yield management aspect of the system 10 is directed towards a system 10 configured to combine message set capability with game design, wherein the game design enables capturing, analyzing, and reporting on individual machine, machine grouping, as well as individual player and player grouping performance over time.

Controlled Access Layer

Referring now to FIG. 5, a preferred embodiment of an IP gaming hub 200 is utilized as a controlled access device that includes a game monitoring system 210, an internal Ethernet switch 220, and a plurality of ports 230. A game monitoring system 210 has the functionality of a GMU, as described above. Typically, a GMU is an in-cabinet device that connects the internal components of gaming devices to the network. In one preferred embodiment, the IP gaming hub 200 can be embodied as an advanced Mastercom type of the device (but incorporating many additional types of functionality beyond that of prior Mastercom devices), as sold by Bally Gaming of Las Vegas Nev.

Preferably, the internal Ethernet switch 220 is not controlled by port location. In one preferred embodiment, the IP gaming hub 200 includes a 6-port Ethernet switch 220. (It should be noted that the system is not restricted to six ports but could be any number of ports). Preferably, one of the ports 230 is the uplink port (in QoS vernacular, the "egress port"). Continuing, in such a preferred embodiment, four of the ports 230 are used to connect to any Ethernet device within the game cabinet. These ports 230 are connectable to the game motherboard, iView-type devices, Alpha-type devices, and the like. Typically, the last of the ports 230 is used internally for SNMP (Simple Network Management Protocol) and formation of the GMU/SDS data packets. Simple Network Management Protocol is a method for a network device to communicate management and error information to a remote server. SNMP can also be used to query a device for information about the device. The SNMP protocol can support monitoring of network-attached devices for any conditions that warrant administrative attention. In one embodiment the uplink port can transact GMU, SNMP, and SDS data and other outbound and inbound traffic. One of ordinary skill in the art will appreciate that other standard broadband protocols, networks, switches, and ports, may be substituted for Ethernet in other embodiments of the system.

In an alternate embodiment, the hub 200 may be implemented as two separate devices. One device could include the switches 230 and Ethernet switch 220 while the GMU portions are in a separate device. Other embodiments of this hub may be implemented without departing from the scope and spirit of the system.

As shown in FIG. 6, the network includes a core layer 301 over a distribution layer 302 above an access layer 303. The core layer 301 serves as a gateway between the servers and the gaming devices. The core layer 301 is contemplated to be a so-called "back end" layer that resides in an administrative location, separate from the gaming floor, for example, and protected physically and electronically.

The distribution layer 302 serves to collect traffic between the core layer 301 and the access layer 303. The distribution layer may comprise trunks and switches that route message and signal traffic through the network. The access layer 303 provides a physical interface between the gaming machines (and any of their associated devices) and the rest of the network. In one preferred embodiment, this is done via managed switches.

In another aspect of a preferred embodiment, the core layer 301 includes one or more servers that are coupled via a communication path to one or more switches. In one embodiment, the servers and switches of the core layer 301 are located within the gaming establishment premises in a secure administrative area. The servers may, but are not required to be, game servers. The communication path may be hardwire (e.g., copper), fiber, wireless, microwave, or any other suitable communication path that may be protected from attack.

The distribution layer 302 communicates with the core layer 301 via high bandwidth communications links. These links may be copper, fiber, or any other suitable link. If desired, redundant links may be built into the system to provide more failsafe operation. The communications links couple the core layer switches to the distribution layer switches.

In another aspect of a preferred embodiment, the distribution layer 302 communicates with the access layer 303 via a high capacity communication link. The link may be wire, fiber, wireless, or any other suitable communication link. In the embodiment, the communication link is coupled to a gaming carousel that comprises a plurality of gaming machines. A managed switch is coupled to the link to provide an interface switch to a plurality of other managed switches.

In one embodiment of the gaming network, the network uses TCP/IP sessions between the gaming machines and the servers. The TCP/IP sessions are used to exchange private information concerning game operations, game performance, network management, patron information, revised game code, accounting information, and other sensitive information. In one embodiment, sessions may be a single message and acknowledgement, or the sessions may be an extended interactive, multiple transaction session. Other instantiations may include UDP/IP, token ring, MQ, and the like.

Moreover, the gaming network may use a number of network services for administration and operation. Dynamic Host Configuration Protocol (DHCP) allows central management and assignment of IP addresses within the gaming network. The dynamic assignment of IP addresses is used in one embodiment instead of statically assigned IP addresses for each network component. A DNS (domain name service) is used to translate between the domain names and the IP addresses of network components and services. DNS servers are well known in the art and are used to resolve the domain names to IP addresses on the Internet.

Similarly, Network Time Protocol (NTP) is used to synchronize time references within the network components for security and audit activities. It is important to have a consistent and synchronized clock so that the order and the timing of transactions within the gaming network can be known with reliability and certainty. Network information can be gathered centrally at a single workstation by using the Remote Monitoring (RMON) protocol. SNMP (simple network management protocol) allows network management components to remotely manage hosts on the network, thus providing scalability. Still further, TFTP (trivial file transfer protocol) is used by servers to boot or download code to network components.

In one embodiment, the network may be implemented using the IPv6 protocol designed by the IETF (Internet Engineering Task Force). When using IPv6, the network may take advantage of the Quality of Service (QoS) features available with IPv6. QoS refers to the ability of a network to provide a guaranteed level of service (e.g., transmission rate, loss rate, minimum bandwidth, packet delay, and the like). QoS may be used as an additional security feature in that certain transactions may request a certain QoS as a rule or pursuant to some schedule.

Referring again to FIG. 5, in a preferred embodiment, all of the ports 230 are internal to the IP gaming hub 200, which enables total control of the ports and a QoS (or other packet delivery prioritizing technology) encoding mechanism 240. As identified above, the SDS data packets are programmatically encoded with a specific QoS high priority level (or other packet delivery prioritizing technology), while all the other data packets are programmatically encoded with a lower priority level (e.g., zero) as the data passes into the downlink port (ingress) and moves to the uplink port (egress). This procedure ensures that the SDS data (or other specifically designated game accounting data) is encoded with a QoS high priority level (or other packet delivery prioritizing technology) at the inception of the packets on the network. Preferably, all of the other ports 230 are set to zero.

In another embodiment the QoS priority level of packets from the ingress ports may be programmatically encoded with a lower priority by hardware located at the egress port rather than by the switch hardware directly at the ingress ports. This allows the use of any available switching circuit whether or not it has the built-in capability of re-marking the priority of ingress packets.

In one preferred embodiment the configuration of the packet QoS encoding methodology in IP gaming hub 200 is administered through the use of an SNMP server located at the core layer of the network. This server allows on-the-fly adjustment of the encoding scheme to which the devices that attach to the ports 230 receive high-priority switching. This server may also be used as an access manager for devices attached to the ports 230 to make requests to be treated as high-priority traffic. In this implementation, a device that is authorized to transmit high-priority traffic but that is currently being treated as a low-priority device, may dynamically request that its data transmissions be re-prioritized to a different priority level.

In a preferred embodiment, as a result of the SDS data (or other specifically designated game accounting data) being encoded within the IP gaming hub 200, there is no possibility of personnel either intentionally or accidentally plugging cables into the incorrect ports 230, since all the cables plugging into the IP gaming hub 200 have the same priority (e.g. zero or other low priority). In one preferred embodiment of the IP gaming hub 200, the SDS data packets always go out first before any data from the ingress ports due to the QoS high packet delivery priority encoding that is implemented on the internal switch 220.

In a preferred embodiment, the uplink (or egress) port 230 of the IP gaming hub 200 connects to a QoS-enabled switch in a carousel. This internal switch 220 has the ability to take the data from its ingress ports 230 and move them to the egress port 230 (i.e., the uplink to the Distribution Layer devices), using QoS prioritizing techniques, thus ensuring that the high priority QoS-encoded packets are passed first. Having the controlled switch 220 located within the IP gaming hub 200 also provides the ability to extract other information from the controlled layer environment. For example, in some embodiments, the IP gaming hub 200 is capable of supplying information about the motherboard and other elements within the cabinet, as well as their relationship with the GMU.

In a preferred embodiment, the controlled ingress system built into the IP gaming hub 200 ensures that the SDS data packets on a shared Ethernet network have correct (i.e. high delivery priority) QoS encoding and ensures that the other ports in the cabinet are set to a standard best delivery encoding (e.g. zero or other low priority). This configuration also presents a suitable cabling configuration since multiple Ethernet ports 230 are accommodated within a cabinet. Accordingly, the multiple Ethernet ports 230 are all accommodated by the IP gaming hub 200 while having only a single wire leave the cabinet. In a preferred embodiment, the Ethernet switches that are utilized are QoS aware.

In one preferred embodiment, these Ethernet switches 220 are connected to a distribution switch in a nearby closet (or other suitable location) and use a QoS encoder 240 to ensure the high priority delivery of the SDS data. In one preferred embodiment, the distribution switch is set to "trust" and uses the QoS encoding that is conveyed by the uplink switch in the carousel. Using the QoS delivery prioritizing information supplied in the IP packets, the packets are moved from the ingress ports (all the carousel switches) to the egress port, which is preferably a gigabit Ethernet connection to the core switch, as shown in FIG. 6.

Referring now to the data flowing from the SDS servers 260 back to the game units, as shown in FIG. 6, the Core Layer switch preferably knows where the SDS servers are attached. Preferably, the switch is in a controlled IT area. In another aspect of one preferred embodiment, the QoS encoding is applied to any packets sent out from the SDS servers 260 and entering the core switch on their assigned port, thereby ensuring that the same delivery priority that is used on the incoming data from the SDS servers is replicated on any outgoing data.

Secure Authentication

In one preferred embodiment, the IP gaming hub 200 is an 802.1x enabled smart device (using extensible authentication protocol) that is intelligent enough to perform an 802.1x secure authentication procedure. 802.1x is a methodology typically used for securing a carousel switch (i.e., locking down the switch), so that only allow approved devices can access a port on the switch. Specifically, 802.1x is an IEEE standard for network access control. 802.1x keeps a network port disconnected until authentication is completed. Depending on the results, the port is either made available to the user, or the user is denied access to the network.

802.1x provides an authentication framework, allowing a user to be authenticated by a central authority. 802.1x uses an existing protocol, the Extensible Authentication Protocol (EAP, RFC 2284) that works on Ethernet, Token Ring, or wireless LANs, for message exchange during the authentication process. The device that contains usernames and passwords and authorizes the access-requesting device is the "authentication server." The authentication server may use the Remote Authentication Dial-In User Service (RADIUS), although 802.1x does not require it.

In an 802.1x Port Based Network Access Control environment there are three participants, the supplicant (or requester), the authenticator, and the authentication server. The supplicant is a person or device that desires access to the network. The authenticator is typically a wired network switch or a wireless access system. The authentication server. This is typically a Radius server but is not required to be by the specification.

Figure 7:
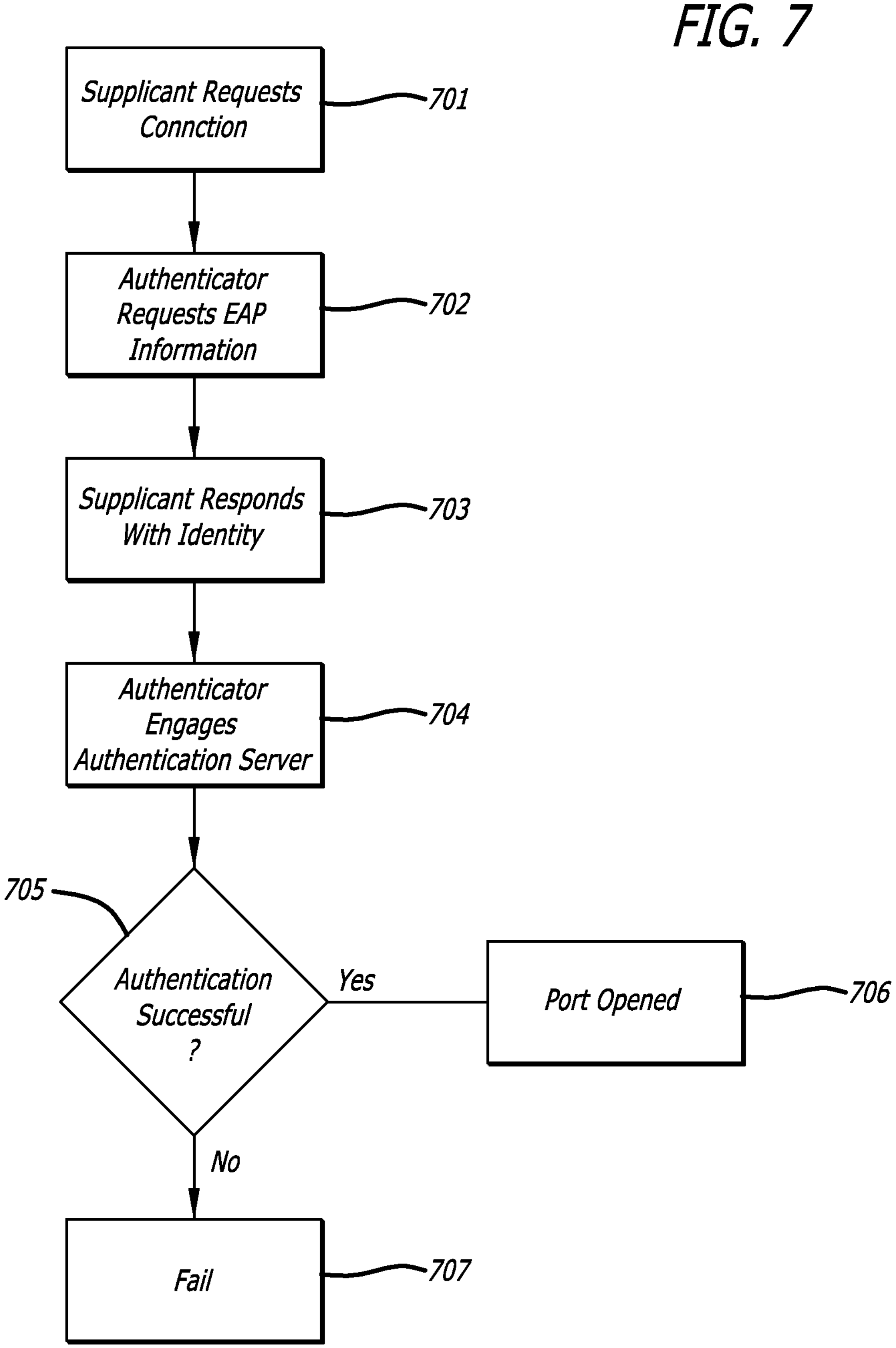
FIG. 7 is a flow diagram illustrating the controlled access layer authentication process of the system.

The operation of a controlled access layer connection is illustrated in the flow diagram of FIG. 7. At step 701 a supplicant requests access to the LAN. At step 702 the authenticator requests information (EAP information such as identity) from the supplicant. No other traffic other than EAP traffic is permitted before authentication is complete.

At step 703 the supplicant responds with its identity. At step 704 the authenticator engages the authentication server and the authentication process begins. At this point the authenticator's task is to relay EAP messages between the supplicant and the authentication server. This process uses the EAP authentication protocol that requires, among other things, identification and password. At step 705 it is determined if the authentication process is successful. If so, then the port is opened for the supplicant at step 706 and the supplicant has access to other LAN devices and resources. If the authentication was not successful, the system fails at step 707.

Figure 8:
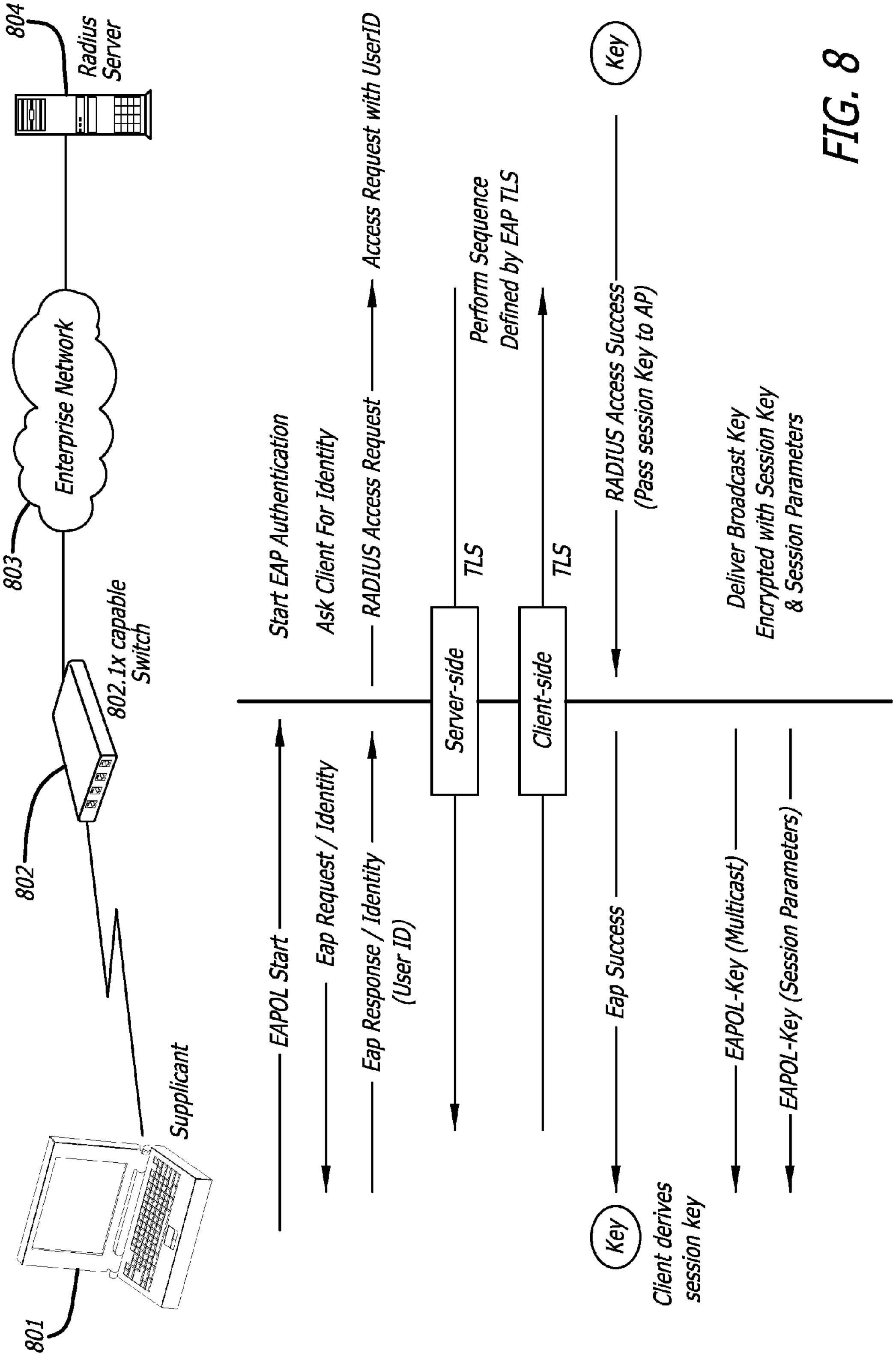
FIG. 8 illustrates another example of authentication using the system.

FIG. 8 illustrates the messaging during authentication between a supplicant 801 and authentication server 804 via authenticator 802 and network 803. The supplicant 801 begins with an EAPOL (EAP encapsulation over LAN) message and the server 804 starts the EAP authentication process. (Note again that all communication is via the authenticator 802 that re-encapsulates EAP messages to the Radius format and forwards them to the server 804). The server 804 asks the supplicant 801 for its client identity which is passed as an EAP request by the authenticator 802 to supplicant 801. The supplicant 801 responds with its identity (e.g. UserID) and a radius access request is sent to the server 804 with the UserID. A TLS tunnel is set up on the server side and client side for secure communication and the sequence defined by EAP TLS is performed. If there is success, a session key is sent to the supplicant 801. The supplicant 801 derives the session key. The server delivers a broadcast key encrypted with session key and session parameters. The supplicant 801 derives the EAPOL key (multicast) and the EAPOL key (session parameters) and its session begins.

Controlled Access Switch

One of the problems that the network industry is facing when trying to implement an 802.1x Port Based Network Access Control security policy is that of devices that do not know how to be 802.1x supplicants. Examples of such devices include printers and faxes. That is, such devices do not have either the processing capability, or programming, to properly engage in the dialogue needed to implement the EAP authentication protocol. The basic state of an 802.1x controlled port is closed to normal network traffic and only allows transmission of EAP packets (to start the authentication process). If a device does not know how to produce or respond to these packets and initiate the authentication process, the port remains closed and the device cannot participate on the network.

One solution is to use Mac Address based port security for those devices. This approach adds administrative problems since two different security mechanisms are being used on different ports. This also requires a network engineer to make manual changes to the switch configuration for the port where the device is connected. Since this is a manual process, errors can be introduced. If for some reason the device changes on that port, the switch configuration needs to be modified to put in the new MAC Address or the new device will not connect. This approach is error prone since often times the personnel deploying the devices are not the same that access the switch. This could mean loss of service until communication is made with the right person to change the switch. Also, since the MAC address is a series of Hexadecimal numbers, mistakes recording from the device and typing them in to the switch are very possible.

The system solves this problem by using a Controlled Access Switch (CAS) that can act as an 802.1x supplicant. The system implements server based software that uses SNMP and a database to insure that only secured non-802.1x capable devices are allowed access.

To be able to have all network ports in the enterprise be set up with 802.1x Port Based Network Access Control, all devices need to be 802.1x capable. This is what the Controlled Access Switch (CAS) does. It allows an organization to use the CAS as a front end to non-802.1x capable devices such as printers and faxes and become the Supplicant in the 802.1x system. It then secures its ingress ports in coordination with the CAS Control Program running on a central site server.

Figure 9:
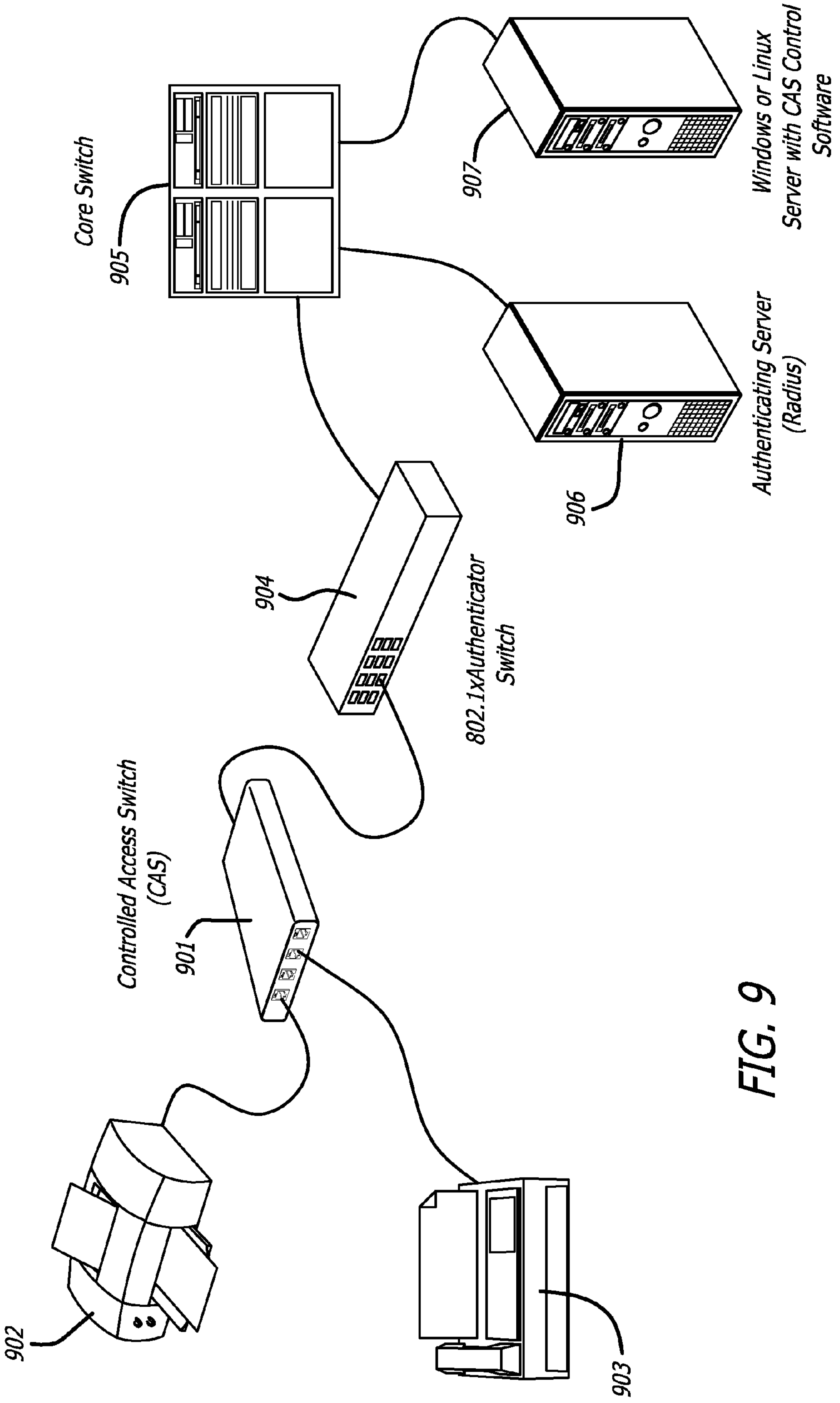
FIG. 9 is a diagram illustrating an embodiment of a controlled access layer system using a controlled access switch.

FIG. 9 illustrates a LAN using the CAS to implement access to the controlled access layer for non-capable devices. The CAS 901 has one or more ports that can be coupled to enabled devices or to non-enabled devices such as printer 902 or fax 903. CAS 901 is itself 802.1x capable and is attached to a port on authenticator/access point 904. Although illustrated with a wired connection, any or all connections herein may be wireless as desired. Authenticator 904 is coupled via a core switch 905 to two servers 906 and 907. Server 906 is an authentication server such as is used with EAP protocol processing. Server 907 implements software or programming that helps manage CAS 901 to allow non-enabled devices access to the network via a controlled access layer such as via 802.1x. In addition to the managing software, the server 907 maintains a database of valid MAC addresses and devices, along with approved port assignments (if desired).

Since the CAS 901 knows when a new device is attached, it sends an SNMP Trap to the CAS Control Program on server 907 via authenticator 904 to initiate a database look up and verification process. Until the CAS 901 receives the affirmation of validity it will keep the requested port quiesed. If a new MAC address is found that is not on the database, the CAS Control Program on server 907 may notify an administrator (via user preference such as email, text message or pager and including the new device's MAC address) that a new device has been inserted into the CAS 901. The administrator can then either accept or reject the new device. Since the administrator does not have to type in the new MAC address, mistyping errors are eliminated.

The CAS 901 has user settable security levels (defaulted to the highest level in one embodiment) that allows the user to define security controls for the ports. For example, the highest level could require administrator involvement to authorize a reinsertion of an already approved MAC address. This mediates the vulnerability of MAC-Address spoofing. If a confirmed MAC address detaches from the CAS, the port will be shut down and will need to be authorized at the CAS Control Program at server 907. Lower security levels may allow a confirmed MAC address to be detached and reinserted. The CAS can also communicate its inventory of MAC addresses attached to its port to the CAS Control Program via SNMP.

Once a new MAC address is confirmed and authorized, the CAS Control Program at server 907 adds it to the database for that particular CAS and communicates with the CAS that that the device is valid and the port should be opened. If rejected, the CAS Control Program communicates that to the CAS and the CAS will not open the port thus securing the port.

CAS

The CAS is in a preferred embodiment an 8 port Network Switch that has the ability to retrieve and store X.509 certificates from a Certificate Authority to use in the 802.1x authentication process. These certificates can be changed at a user-preferred interval. It may also have the ability to save the verified MAC addresses in non-volatile storage so that it can maintain the information beyond power outages.

The CAS allows a verified device to be attached to any port in the switch so that if a deployment person needs to detach the device from the CAS the reattachment does not have to go into the same port.

If an unauthorized device is used to replace the CAS at the network jack, the normal 802.1x Port Based Network Access Control of the upstream switch takes over the verification of the new device in a normal manner according to the 802.1x specifications.

Control Program

The CAS Control Program is a program that can run on a Windows Server 2000 or above or a Linux server. It uses a MySQL database to store information about CAS and MAC address relationships. It can also monitor the CAS connection and report that information to different SNMP monitor programs such as HP Openview. In one embodiment the control program is implemented on the authentication server.

Figure 10:
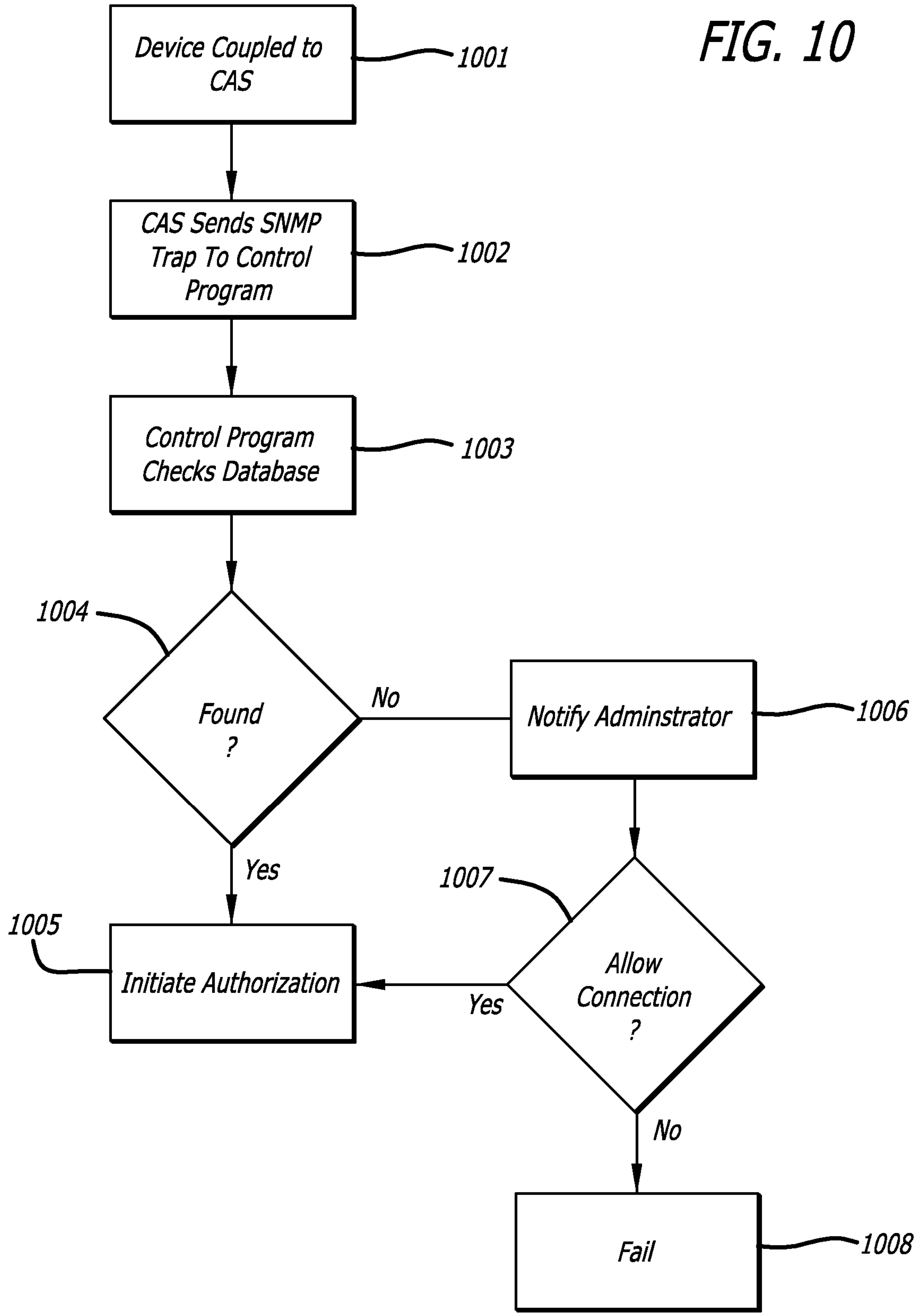
FIG. 10 is a flow diagram illustrating operation of the control program of the system.

FIG. 10 is a flow diagram illustrating the operation of the control program in one embodiment of the system. At step 1001 a device is coupled to the CAS. At step 1002 the CAS communicates with the control program to initiate the process. This communication may take the form of an SMNP trap. At step 1003 the control program checks its database for the MAC address of the device trying to connect.

At decision block 1004 it is determined if the device is found in the database. If so, the authorization procedure is initiated at step 1005. If not an administrator is notified at step 1006. (Note that the involvement of the administrator may be an optional step and may depend on the security level of the system). At step 1007 it is determined if the administrator has agreed to allow the device to connect. If so, the authorization process is initiated at step 1005. If not, the connection attempt fails at step 1008.

Because the port on the CAS is closed to network traffic and only open to authentication request messages, the controlled access layer is protected from unauthorized access.

Although the system has been described in language specific to computer structural features, methodological acts, and by computer-readable media, it is to be understood that the system defined in the appended claims is not necessarily limited to the specific structures, acts, or media described. Therefore, the specific structural features, acts and mediums are disclosed as exemplary embodiments implementing the system.

Furthermore, the various embodiments described above are provided by way of illustration only and should not be construed to limit the system. Those skilled in the art will readily recognize various modifications and changes that may be made to the system without following the example embodiments and applications illustrated and described herein, and without departing from the true spirit and scope of the system, which is set forth in the following claims.

What is claimed is:

1. A controlled configuration and management system for monitoring and controlling one or more gaming devices in a gaming system on at least one gaming floor using a secure authentication procedure for authorizing devices to access the gaming system, the system comprising:

an authentication server for determining if gaming devices are authorized to access the gaming system;

an authenticator coupled to the authentication server;

a gaming machine comprising at least one gaming device enabled for the secure authentication procedure of the controlled access system couple to the authenticator;

the gaming machine further comprising at least one gaming device non-enabled for the secure authentication procedure of the controlled access system; and a controlled access switch coupled between the at least one non-enabled gaming device and the authenticator, wherein the controlled access switch operates as a front end to the secure authentication procedure for the at least one non-enabled gaming device wherein;

the at least one non-enabled gaming device is associated with a unique identifier;

the authentication server maintains a database of identifiers associated with authorized non-enabled gaming devices;

the secure authentication procedure comprises sending the identifier associated with the non-enabled gaming device to the authentication server via the authenticator; and the authentication server either accepts or rejects the non-enabled gaming device based on the identifier associated with that device.

2. The system of claim 1 wherein the controlled access switch has one or more ports which may be coupled to gaming devices enabled for the secure authentication procedure or gaming device non-enabled for the secure authentication procedure.

3. In a controlled access system using a secure authentication procedure for authorizing devices to access the system comprising: a device non-enabled for the secure authentication procedure and associated with an identifier, an authentication server, implementing a control program and maintaining a database of identifiers, for determining if devices are authorized to access the system, an authenticator coupled to the authentication server, and a controlled access switch coupled to the authenticator, a method for operating the system comprising:

coupling a device non-enabled for the secure authentication procedure to a port on the controlled access switch;

the controlled access switch communicating with the control program on the authentication server via the authenticator;

the authentication server checking the database for the identifier of the non-enabled device;

if the identifier associated with the device is found in the database, authorizing the device to access the system;

if the identifier associated with the device is not found in the database:

notifying an administrator;

if the administrator agrees to allow the device to access the system, authorizing the device to access the system;

if the administrator does not agree to allow the device to access the system, denying the device access to the system.

4. The method of claim 3 wherein the controlled access switch keeps the port quiescent until the device is authorized to access the system.

* * * * *